(12) United States Patent
Lin et al.

(10) Patent No.: US 11,986,777 B2
(45) Date of Patent: *May 21, 2024

(54) HOLLOW FIBER MEMBRANES WITH NUCLEATING AGENT AND METHODS OF MAKING AND USING THE SAME

(71) Applicant: Solventum Intellectual Properties Company, Maplewood, MN (US)

(72) Inventors: Kuan-Yin Lin, Woodbury, MN (US); James C. DeLozier, Fort Mill, SC (US); Aurore Y. J. Mercelat, Dinard (FR); Mark McCormick, St. Paul, MN (US); Jinsheng Zhou, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/309,691

(22) PCT Filed: Dec. 23, 2019

(86) PCT No.: PCT/IB2019/061311
§ 371 (c)(1),
(2) Date: Jun. 15, 2021

(87) PCT Pub. No.: WO2020/136568
PCT Pub. Date: Jul. 2, 2020

(65) Prior Publication Data
US 2021/0331120 A1 Oct. 28, 2021

Related U.S. Application Data

(60) Provisional application No. 62/885,572, filed on Aug. 12, 2019, provisional application No. 62/785,639, filed on Dec. 27, 2018.

(51) Int. Cl.
*B01D 53/22* (2006.01)
*B01D 67/00* (2006.01)
(Continued)

(52) U.S. Cl.
CPC ........... *B01D 69/02* (2013.01); *B01D 53/228* (2013.01); *B01D 67/0027* (2013.01);
(Continued)

(58) Field of Classification Search
CPC ............ B01D 69/088; B01D 2325/022; B01D 67/0027; B01D 69/02; B01D 2325/04;
(Continued)

(56) References Cited

U.S. PATENT DOCUMENTS 3,303,178 A * 2/1967 Krishnamurthy ....... C08F 10/14
502/103
4,664,681 A 5/1987 Anazawa
(Continued)

FOREIGN PATENT DOCUMENTS

EP 0299381 1/1989
EP 3902624 11/2021
(Continued)

OTHER PUBLICATIONS

"100408_TPX" https://www.mitsui.com/de/en/business/plastics/_icsFiles/afieldfile/2015/12/25/100408_TPX.pdf 6 pages, file time stamped as "Created" under "Document properties" Apr. 8, 2010 (Year: 2010).*
(Continued)

*Primary Examiner* — Anthony R Shumate

(57) ABSTRACT

Hollow fiber membranes, membrane contactors, and related production and use methods. The membranes include a substrate having a multiplicity of pores and a skin layer overlaying the porous substrate. The porous substrate includes a first semi-crystalline thermoplastic polyolefin (Continued)

(co)polymer resin and a nucleating agent in an amount effective to achieve nucleation. The skin layer includes a second semi-crystalline thermoplastic polyolefin (co)polymer resin derived by polymerizing at most 98 wt. % of 4-methyl-1-pentene monomer with at least 2 wt. % of linear or branched alpha olefin monomers. Preferably, the first thermoplastic polyolefin (co)polymer is different from the second thermoplastic polyolefin (co)polymer. The skin layer is less porous than the porous substrate and forms an outer surface of the hollow fiber with the porous substrate forming an inner surface. The hollow fibers are formed by co-extruding the porous substrate resin and the skin layer resin through an annular die.

19 Claims, 4 Drawing Sheets

(51) Int. Cl.
  *B01D 69/02* (2006.01)
  *B01D 69/08* (2006.01)
  *B01D 71/26* (2006.01)
  *B01D 19/00* (2006.01)

(52) U.S. Cl.
  CPC ......... *B01D 69/088* (2013.01); *B01D 71/261* (2022.08); *B01D 71/262* (2022.08); *B01D 19/0031* (2013.01); *B01D 2053/224* (2013.01); *B01D 2325/022* (2013.01); *B01D 2325/04* (2013.01)

(58) Field of Classification Search
  CPC .............. B01D 53/228; B01D 19/0031; B01D 2053/224; B01D 71/26
  See application file for complete search history.

(56) References Cited

U.S. PATENT DOCUMENTS

| | | | |
|---|---|---|---|
| 4,713,292 A | 12/1987 | Takemuru | |
| 5,254,143 A | 10/1993 | Anazawa | |
| 6,375,876 B1 | 4/2002 | Kessler | |
| 6,379,796 B1 | 4/2002 | Uenishi | |
| 6,447,679 B1 | 9/2002 | Watari | |
| 6,497,752 B1 | 12/2002 | Kessler | |
| 8,951,677 B2* | 2/2015 | Ishihara | H01M 50/449 429/246 |
| 9,694,326 B2 | 7/2017 | Shibata | |
| 2003/0027908 A1* | 2/2003 | Dotson | C08K 5/098 524/394 |
| 2005/0087487 A1 | 4/2005 | Sakamoto | |
| 2010/0209745 A1* | 8/2010 | Kimishima | H01M 50/406 429/50 |
| 2015/0258500 A1 | 9/2015 | Cho | |
| 2015/0299526 A1* | 10/2015 | Gray | C08K 5/0016 524/153 |
| 2016/0128877 A1* | 5/2016 | Chandrasekaran | A61F 13/58 156/60 |
| 2016/0136002 A1* | 5/2016 | Chandrasekaran | A61F 13/15203 264/413 |

FOREIGN PATENT DOCUMENTS

| | | |
|---|---|---|
| JP | H07-116483 | 5/1995 |
| JP | 2009-112896 A | 5/2009 |
| JP | 2015-186862 | 10/2015 |
| JP | 2016187802 | 11/2016 |
| WO | WO 2020-136560 | 7/2020 |
| WO | WO 2020/136560 A1 | 7/2020 |

OTHER PUBLICATIONS

Tpx Properties: "Type Grade List Methodology Measured Condition / Sample Condtion Unit Density MCI Method Density Gradient Method / Pellets kg/m 3", May 13, 2022 (May 13, 2022), pp. 1-1, XP055921110, Retrieved from the Internet: URL:https://jp.mitsuichemicals.com/en/special/tpx/pdf/TPX_Properties_Table_(ISO).pdf [retrieved on May 13, 2022].
Supplementary European Search Report, dated Aug. 15, 2022, 2 pgs.
Belmontes, "Effect of Different Nucleating Agents on the Crystallization of Ziegler-Natta Isotactic Polypropylene", International Journal of Polymer Science, Jun. 2016, vol. 2016, pp. 1-9.
Puleo, "Gas sorption and transport in semicrystalline poly(4-methyl-1-pentene)", Polymer, Jul. 1989, vol. 30, No. 7, pp. pp. 1357-1366.
Seven, "Nucleating Agents for High-Density Polyethylene—A Review", Polymer Engineering & Science, 2016, vol. 561, No. 5, pp. 541-554.
International Search Report for PCT International Application No. PCT/IB2019/061311, dated Mar. 12, 2020, 4 pages.
Elton N Kaufmann et al.: "Characterization of Materials, edited by Porosity and its Measurement", Jan. 1, 2012, XP055522883. Retrieved from the Internet: URL: https://ws680.nist.gov/publication/get_pdf.cfm?pub_id=910393 [retrieved on Nov. 12, 2018].

* cited by examiner

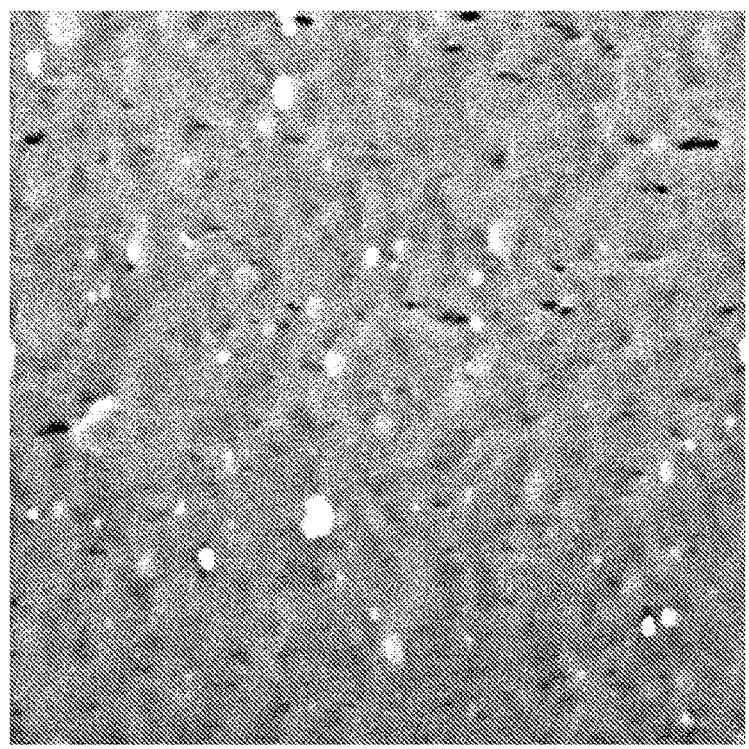
*Fig. 4a*  5μm
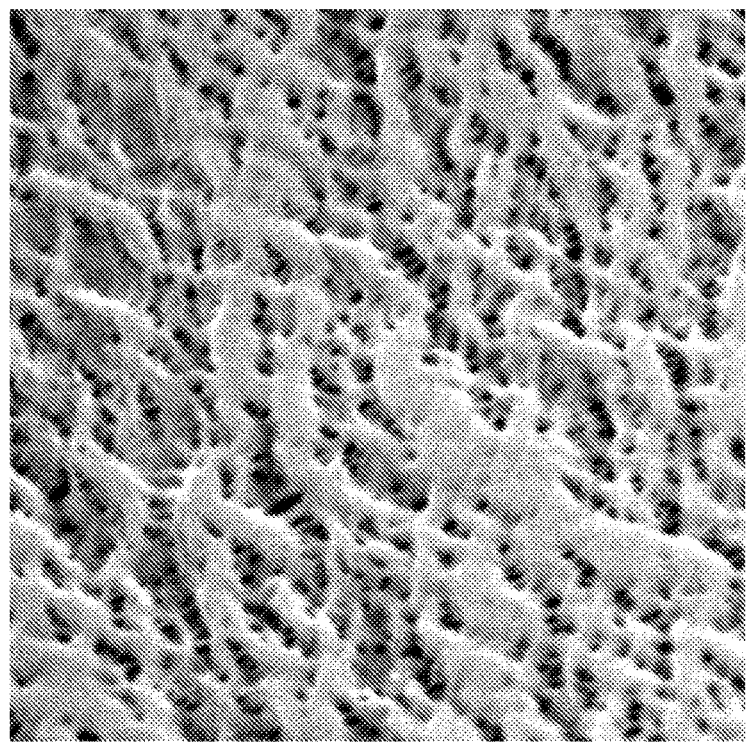
*Fig. 4b*  5μm

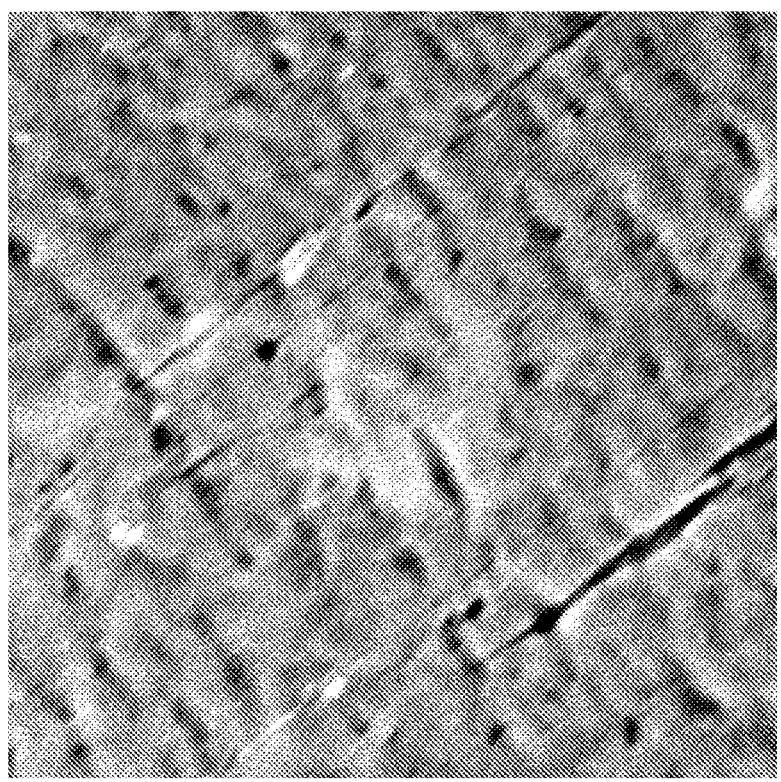
Fig. 4c  5μm

HOLLOW FIBER MEMBRANES WITH NUCLEATING AGENT AND METHODS OF MAKING AND USING THE SAME

CROSS REFERENCE TO RELATED APPLICATIONS

This application is a national stage filing under 35 U.S.C. 371 of PCT/IB2019/061311, filed Dec. 23, 2019, which claims the benefit of U.S. Application No. 62/785,639, filed Dec. 27, 2018; and U.S. Application No. 62/885,572, filed Aug. 12, 2019, the disclosure of which is incorporated by reference in its/their entirety herein.

TECHNICAL FIELD

The present disclosure relates to asymmetric microporous hollow fiber membranes and gas permeable articles made using such hollow fiber membranes, as well as methods of making and using such hollow fiber membranes and gas permeable articles.

BACKGROUND

Microporous hollow fiber membranes can be used to separate components from a fluid stream on the basis of size, phase, charge, and the like. Microporous hollow fibers often employ materials having a controlled porosity and pore size on the order of a few micrometers, and can have many uses including, for example, separation, filtration, diffusion, and barrier applications. These broad applications have been practically applied in medical devices, electrochemical devices, chemical processing devices, pharmaceutical devices, and water purification, to name a few.

SUMMARY

The functionality of a microporous hollow fiber membrane is often a complex function of the particular end-use application, the structure of the hollow fiber (e.g., the hollow fiber diameter, wall thickness, porosity, pore size, and pore tortuosity), and the composition or chemical nature of the asymmetric hollow fiber membrane surfaces. Often, these and other variables of the hollow fiber must be tailored to the particular end-use application. For example, a membrane with a gas permeable separation layer may be used to provide selective gas/gas and/or gas/liquid passage.

Asymmetric microporous hollow fiber membranes, allowing the selective passage of dissolved gases and blockage of liquid water or other aqueous liquids, may be advantageously used in a membrane contactor to achieve gas/liquid separation in certain applications, such as the degassing of aqueous printing inks during printing, or the separation of dissolved gases such as carbon dioxide or methane from aqueous brines used to enhance petroleum recovery.

Membrane contactors useful for gas/liquid separation applications may be advantageously fabricated using hydrophobic asymmetric microporous hollow fiber membranes. Since the membranes are hydrophobic and have very small pores, liquid will not easily pass through the pores and is retained at the inner or outer membrane surface of the hollow fiber membrane. The hydrophobic hollow fiber membrane surface acts to separate the gas phase from the liquid phase without dispersion. Such membrane contactors may be used advantageously to selectively separate gasses such as air, carbon dioxide, or methane from an aqueous liquid, such as water or an aqueous brine.

At least certain known microporous hollow fiber membranes have been found less than fully satisfactory in some particular gas/liquid separation applications, under certain operating conditions. Accordingly, a need exists for an improved hollow fiber membrane contactor having improved design or operating characteristics over known membrane contactors designed for particular end-use applications.

For example, in view of environmental concerns, the desire to separate components, the need to protect process equipment, and/or efforts to improve process efficiency, it is often necessary or desirable to remove one or more components or contaminants from an effluent stream so that the component or contaminant does not pollute the environment, negatively affect equipment, or so that it may be recycled. Existing industrial processes frequently must be upgraded to reduce environmental emissions and/or increase efficiency. Therefore, a need often arises for a process and system that can be economically retrofit to an existing manufacturing plant or process to reduce emissions, protect equipment, recycle, or improve efficiency.

The use of porous materials for the selective passage of humidity (moisture vapor) and blockage of liquid water, liquid desiccant, or other aqueous solutions may also be desirable. In such liquid-desiccant systems, temperature and humidity may be controlled by a salt solution (or desiccant) which absorbs or emits water vapor. The use of porous materials for the selective passage of water vapor (heat and moisture) and the blockage of gasses (exhaust and intake gases) may be particularly desirable in connection with energy recovery ventilation (ERV) wherein heat and humidity are exchanged between make-up and exhaust air in a ventilation system.

Thus, there also is a need for improved microporous hollow fiber membrane materials so that they may be used in a wider spectrum of applications, may perform better for particular purposes, under certain operating conditions, or the like. A need also exists for an improved membrane contactor having improved design or characteristics over known membrane contactors, for use in gas/liquid separation in certain applications, such as the degassing of aqueous printing inks during printing, or the separation of dissolved gases such as carbon dioxide or methane from aqueous brines used to enhance petroleum recovery, and the like. It is to the provision of an asymmetric microporous hollow fiber membrane device meeting these or other needs that at least certain exemplary embodiments of the present disclosure are directed.

Membrane contactors including microporous hollow fiber membranes can be used for a variety of applications, including the separation of a component from a fluid or transferring a component of one fluid to another. For example, a membrane contactor including a multiplicity of microporous hollow fiber membranes can be used to remove dissolved gases from a liquid stream. In many industrial processes, the composition and amount of dissolved gases must be well-controlled for example, to prevent pipe corrosion, to improve inkjet printing reliability and quality, and to increase the accuracy of instrument analysis.

It is to the provision of a membrane contactor device including a multiplicity of microporous hollow fiber membranes and/or methods of making and using such membranes contactors and hollow fiber membranes meeting these and/or other needs that at least certain selected embodiments of the present disclosure may be directed. It is to the provision of a porous hollow fiber membrane device and/or method meeting these and/or other needs that at least selected embodiments of the present disclosure may be directed.

Briefly, in one aspect, the present disclosure describes an asymmetric hollow fiber membrane including a porous substrate having a multiplicity of pores, and a skin layer overlaying the porous substrate. The porous substrate includes a first semi-crystalline thermoplastic polyolefin (co)polymer and a nucleating agent in an amount effective to achieve nucleation. The skin layer includes a second semi-crystalline thermoplastic polyolefin (co)polymer derived by polymerizing at most 98 wt. % of 4-methyl-1-pentene monomer with at least 2 wt. % of linear or branched alpha olefin monomers selected from the group consisting of ethylene, propylene, 1-butene, 1-pentene, 1-hexene, 1-heptene, isobutylene, vinylcyclohexane, 3-ethyl-1-pentene, 1,3-methyl-1-pentene, cyclobutene, cyclopentane, 2-norbornene, 3-methyl-2-norbornene, 5-methyl-2-norbornene, tetracyclododecene, methyltetracyclododecene, dimethyltetracyclododecene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof. In some exemplary embodiments, the first thermoplastic polyolefin (co)polymer is compositionally different from the second thermoplastic polyolefin (co)polymer In certain exemplary embodiments, the second semi-crystalline thermoplastic polyolefin (co)polymer is a homopolymer of the linear or branched alpha olefin monomers.

In certain presently-preferred embodiments, the multiplicity of pores includes micropores. In some exemplary embodiments, the micropores have a diameter of from 0.01 micrometer to 1.0 micrometer. In other embodiments, the micropores have a diameter of from 0.02 micrometer to 0.5 micrometer. In further exemplary embodiments, the asymmetric hollow fiber membrane exhibits a porosity of from 5% to 80%. In other embodiments, the asymmetric hollow fiber membrane exhibits a porosity of from 10% to 50%.

In another aspect, the present disclosure describes a separation article comprising a multiplicity of the asymmetric hollow fiber membranes according to any of the foregoing embodiments. In some exemplary embodiments, the multiplicity of asymmetric hollow fiber membranes is arranged in an array, which may be formed by knitting. Optionally, the array is pleated, folded, or rolled into a cylinder or a cassette.

In further exemplary embodiments, the separation article is selectively permeable to $CO_2$ over $N_2$ or $CH_4$. Preferably, the separation article exhibits a $CO_2/N_2$ selectivity of at least 8. In other exemplary embodiments, the filtration article is selectively permeable to $O_2$ over $N_2$.

In a further aspect, the disclosure describes a method of using any of the foregoing separation articles, wherein the separation article is used to separate a gas phase from a liquid phase. In certain embodiments, the gas phase includes $N_2$, $O_2$, $CO_2$, $CH_4$, or a combination thereof. In some such embodiments, the liquid phase includes liquid water. Optionally, the liquid phase is an aqueous printing ink, or an aqueous brine.

In a final aspect, the disclosure describes a method of making an asymmetric hollow fiber membrane including providing a substrate resin and a skin layer resin, co-extruding the substrate resin and the skin layer resin to form an asymmetric hollow fiber membrane precursor, and stretching the asymmetric hollow fiber membrane precursor to form an asymmetric hollow fiber membrane having a skin layer made of the skin layer resin overlaying a porous substrate made of the substrate resin and having a multiplicity of pores.

The substrate resin includes a first semi-crystalline thermoplastic polyolefin (co)polymer and a nucleating agent in an amount effective to achieve nucleation. The skin layer resin includes a second semi-crystalline thermoplastic polyolefin (co)polymer derived by polymerizing at most 98 wt. % of 4-methyl-1-pentene monomer with at least 2 wt. % of linear or branched alpha olefin monomers selected from the group consisting of ethylene, propylene, 1-butene, 1-pentene, 1-hexene, 1-heptene, isobutylene, vinylcyclohexane, 3-ethyl-1-pentene, 1,3-methyl-1-pentene, cyclobutene, cyclopentane, 2-norbornene, 3-methyl-2-norbornene, 5-methyl-2-norbornene, tetracyclododecene, methyltetracyclododecene, dimethyltetracyclododecene 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof. In some exemplary embodiments, the first thermoplastic polyolefin (co)polymer is compositionally different from the second thermoplastic polyolefin (co)polymer. In certain exemplary embodiments, the second semi-crystalline thermoplastic polyolefin (co)polymer is a homopolymer of the linear or branched alpha olefin monomers.

In some exemplary embodiments, the skin layer resin is substantially free of any pore-forming material in an amount effective to cause pore formation. In some such embodiments, co-extruding the substrate resin and the skin layer resin to form an asymmetric hollow fiber membrane precursor includes co-extruding the substrate resin and the skin layer resin through an annular co-extrusion die to form the asymmetric hollow fiber precursor.

In certain exemplary embodiments, the method further includes annealing the asymmetric hollow fiber precursor. Preferably, annealing the asymmetric hollow fiber precursor includes annealing the asymmetric hollow fiber precursor prior to stretching the asymmetric hollow fiber precursor.

Various unexpected results and advantages may be obtained in exemplary embodiments of the disclosure. One such advantage of certain exemplary embodiments of the present disclosure is that the asymmetric hollow fiber membrane may achieve both very high gas flux and high $CO_2/N_2$ selectivity compared to other types of membranes. The asymmetric hollow fiber membrane may also exhibit uniform pore size and high porosity compared to other types of membranes.

LISTING OF EXEMPLARY EMBODIMENTS

A. An asymmetric hollow fiber membrane comprising:
  a porous substrate having a plurality of pores, wherein the porous substrate includes a first semi-crystalline thermoplastic polyolefin (co)polymer derived by polymerizing at most 3 wt. % of linear or branched alpha olefin monomers with at least 97 wt. % of 4-methyl-1-pentene monomer; and
  a skin layer overlaying the porous substrate, wherein the skin layer includes a second semi-crystalline thermoplastic polyolefin (co)polymer derived by polymerizing at most 98 wt. % of 4-methyl-1-pentene monomer with at least 2 wt. % of linear or branched alpha olefin monomers selected from the group consisting of ethylene, propylene, 1-butene, 1-pentene, 1-hexene, 1-heptene, isobutylene, vinylcyclohexane, 3-ethyl-1-pentene, 1,3-methyl-1-pentene, cyclobutene, cyclopentane, 2-norbornene, 3-methyl-2-norbornene, 5-methyl- 2-norbornene, tetracyclododecene, methyltetracyclododecene, dimethyltetracyclododecene 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof B. The asymmetric hollow fiber membrane of Embodiment A, wherein the first semi-crystalline thermoplastic polyolefin (co)polymer is derived by polymerizing one or more branched or linear alpha olefin monomers selected from the group consisting of ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof.

C. The asymmetric hollow fiber membrane of Embodiments A or B, wherein the first semi-crystalline thermoplastic polyolefin (co)polymer exhibits a Melt Flow Index of from 0.1 to 200 g/10 min measured at 230° C. under a load of 5 $kg_f$.

D. The asymmetric hollow fiber membrane of any preceding Embodiment, wherein the first semi-crystalline thermoplastic polyolefin (co)polymer comprises polypropylene.

E. The asymmetric hollow fiber membrane of any preceding Embodiment, wherein the first semi-crystalline thermoplastic polyolefin (co)polymer comprises polyethylene.

F. The asymmetric hollow fiber membrane of any preceding Embodiment, wherein the nucleating agent comprises an alpha nucleating agent.

G. The asymmetric hollow fiber membrane of any preceding Embodiment, wherein the porous substrate is comprised of no more than 5 wt. % of the nucleating agent.

H. The asymmetric hollow fiber membrane of Embodiment G, wherein the porous substrate is comprised of no more than 2.5 wt. % of the nucleating agent.

I. The asymmetric hollow fiber membrane of Embodiment H, wherein the porous substrate is comprised of no more than 0.5 wt. % of the nucleating agent.

J. The asymmetric hollow fiber membrane of any preceding Embodiment, wherein the plurality of pores comprises micropores.

K. The asymmetric hollow fiber membrane of Embodiment J, wherein the plurality of micropores has a diameter of from 0.01 micrometer to 1.0 micrometer.

L. The asymmetric hollow fiber membrane of Embodiment K, wherein the plurality of micropores has a diameter of from 0.02 micrometer to 0.5 micrometer.

M. The asymmetric hollow fiber membrane of any preceding Embodiment, wherein the asymmetric hollow fiber membrane exhibits a porosity of from 5% to 80%.

N. The asymmetric hollow fiber membrane of Embodiment M, wherein the asymmetric hollow fiber membrane exhibits a porosity of from 10% to 50%.

O. The asymmetric hollow fiber membrane of any preceding Embodiment, wherein the skin layer is less porous than the porous substrate and comprises an outer surface of the asymmetric hollow fiber membrane, optionally wherein the porous substrate comprises an inner surface of the asymmetric hollow fiber membrane.

P. The asymmetric hollow fiber membrane of Embodiment 0, wherein the skin layer is non-porous.

Q. The asymmetric hollow fiber membrane of any preceding Embodiment, wherein the skin layer has a thickness of less than 20 micrometers.

R. The asymmetric hollow fiber membrane of Embodiment Q, wherein the skin layer has a thickness of less than 5 micrometers.

S. The asymmetric hollow fiber membrane of any preceding Embodiment, wherein the porous substrate has a thickness of from 10 micrometers to 200 micrometers.

T. The asymmetric hollow fiber membrane of Embodiment S, wherein the porous substrate has a thickness of from 10 micrometers to 100 micrometers.

U. The asymmetric hollow fiber membrane of Embodiment T, wherein the porous substrate has a thickness of from 20 micrometers to 60 micrometers.

V. The asymmetric hollow fiber membrane of any preceding Embodiment, wherein the asymmetric hollow fiber membrane is a non-homogeneous asymmetric hollow fiber membrane.

W. The asymmetric hollow fiber membrane of any preceding Embodiment, wherein the skin layer completely covers the porous substrate.

X. The asymmetric hollow fiber membrane of any preceding Embodiment, wherein the first semi-crystalline thermoplastic polyolefin (co)polymer exhibits a melting temperature ($T_m$) greater than a melting temperature of the second semi-crystalline thermoplastic polyolefin (co)polymer.

Y. The asymmetric hollow fiber membrane of any preceding Embodiment, wherein a crystallinity of the first thermoplastic polyolefin (co)polymer is at least 40%.

Z. The asymmetric hollow fiber membrane of any preceding Embodiment, wherein a crystallinity of the second thermoplastic polyolefin (co)polymer is less than about 40%.

AA. A separation article comprising a plurality of the asymmetric hollow fiber membranes according to any preceding Embodiment.

BB. The separation article of Embodiment AA, wherein the plurality of the asymmetric hollow fiber membranes is arranged in an array, optionally wherein the array is pleated, folded, or rolled into a cylinder or cassette.

CC. The separation article of Embodiment AA or BB, wherein the separation article is selectively permeable to $CO_2$ over $N_2$ or $CH_4$.

DD. The separation article of Embodiment CC, wherein the $CO_2/N_2$ or $CO_2/CH_4$ selectivity of the separation article is at least 8.

EE. The separation article of Embodiment AA or BB, wherein the filtration article is selectively permeable to $O_2$ over $N_2$.

FF. A method of using the separation article of any one of Embodiment AA, BB, CC, DD or EE, wherein the separation article is used to separate a gas phase from a liquid phase.

GG. The method of Embodiment FF, wherein the gas phase comprises $N_2$, $O_2$, $CO_2$, $CH_4$, or a combination thereof.

HH. The method of Embodiment FF or GG, wherein the liquid phase comprises water, optionally wherein the liquid phase is an aqueous printing ink, or an aqueous brine.

II. A method of making an asymmetric hollow fiber membrane comprising: providing a substrate resin and a skin layer resin,
the substrate resin including a first semi-crystalline thermoplastic polyolefin (co)polymer and a nucleating agent in an amount effective to achieve nucleation, the skin layer resin including a second semi-crystalline thermoplastic polyolefin (co)polymer derived by polymerizing at most 98 wt. % of 4-methyl-1-pentene monomer with at least 2 wt. % of linear or branched alpha olefin monomers selected from the group consisting of ethylene, propylene, 1-butene, 1-pentene, 1-hexene, 1-heptene, isobutylene, vinylcyclohexane, 3-ethyl-1-pentene, 1,3-methyl-1-pentene, cyclobutene, cyclopentane, 2-norbornene, 3-methyl-2-norbornene, 5-methyl-2-norbornene, tetracyclododecene, methyltetracyclododecene, dimethyltetracyclo-dodecene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof, optionally wherein the first thermoplastic polyolefin (co)polymer is compositionally different from the second thermoplastic polyolefin (co)polymer;

co-extruding the substrate resin and the skin layer resin to form an asymmetric hollow fiber membrane precursor; and stretching the asymmetric hollow fiber membrane precursor to form an asymmetric hollow fiber membrane having a porous substrate comprised of the substrate resin and comprising a plurality of pores, and a skin layer comprised of the skin layer resin overlaying the porous substrate.

JJ. The method of Embodiment II, wherein co-extruding the substrate resin and the skin layer resin to form an asymmetric hollow fiber membrane precursor includes co-extruding the substrate resin and the skin layer resin through an annular co-extrusion die to form the asymmetric hollow fiber precursor.

KK. The method of any one of Embodiments II or JJ, further including annealing the asymmetric hollow fiber precursor.

LL. The method of Embodiment KK, wherein annealing the asymmetric hollow fiber precursor includes annealing the asymmetric hollow fiber precursor prior to stretching the asymmetric hollow fiber precursor.

MM. The method of any one of Embodiments II, JJ, KK or LL, wherein the skin layer comprises an outer surface, an inner surface, or both an outer surface and an inner surface of the asymmetric hollow fiber membrane.

NN. The method of any one of Embodiments II, JJ, KK, LL or MM, wherein the skin layer resin is substantially free of any pore-forming material in an amount effective to cause pore formation.

OO. The method of any one of Embodiments II, JJ, KK, LL, MM or NN, wherein co-extruding the substrate resin and the skin layer resin to form an asymmetric hollow fiber membrane precursor includes co-extruding the substrate resin and the skin layer resin through an annular co-extrusion die to form the asymmetric hollow fiber precursor.

PP. The method of any one of Embodiments II, JJ, KK, LL, MM, NN or OO, wherein the plurality of pores comprises micropores.

QQ. The method of Embodiment PP, wherein the plurality of micropores has a diameter of from 0.01 micrometer to 1.0 micrometer.

RR. The method of Embodiment QQ, wherein the plurality of micropores has a diameter of from 0.02 micrometer to 0.5 micrometer.

SS. The method of any one of Embodiments II, JJ, KK, LL, MM, NN, OO, PP, QQ or RR, wherein the asymmetric hollow fiber membrane exhibits a porosity of from 5% to 80%.

TT. The method of Embodiment SS, wherein the asymmetric hollow fiber membrane exhibits a porosity of from 10% to 50%.

UU. The method of any one of Embodiments II, JJ, KK, LL, MM, NN, OO, PP, QQ, RR, SS or TT, wherein the skin layer is less porous than the porous substrate and comprises an outer surface of the asymmetric hollow fiber membrane, optionally wherein the porous substrate comprises an inner surface of the asymmetric hollow fiber membrane.

VV. The method of Embodiment UU, wherein the skin layer is non-porous.

WW. The method of any one of Embodiments II, JJ, KK, LL, MM, NN, OO, PP, QQ, RR, SS, TT, UU or VV, wherein the first semi-crystalline thermoplastic polyolefin (co)polymer exhibits a melting temperature ($T_m$) greater than a melting temperature of the second semi-crystalline thermoplastic polyolefin (co)polymer.

XX. The method of any one of Embodiments II, JJ, KK, LL, MM, NN, OO, PP, QQ, RR, SS, TT, UU, VV or WW, wherein a crystallinity of the first thermoplastic polyolefin (co)polymer is at least 40 wt. %.

YY. The method of any one of Embodiments II, JJ, KK, LL, MM, NN, OO, PP, QQ, RR, SS, TT, UU, VV, WW or XX, wherein a crystallinity of the second thermoplastic polyolefin (co)polymer is less than 40 wt. %.

ZZ. The method of any one of Embodiments II, JJ, KK, LL, MM, NN, OO, PP, QQ, RR, SS, TT, UU, VV, WW, XX or YY, wherein the skin layer has a thickness of less than 20 micrometers.

AAA. The method of Embodiment ZZ, wherein the skin layer has a thickness of less than 5 micrometers.

BBB. The method of any one of Embodiments II, JJ, KK, LL, MM, NN, OO, PP, QQ, RR, SS, TT, UU, VV, WW, XX, YY, ZZ or AAA, wherein the porous substrate has a thickness of from 5 micrometers to 200 micrometers.

CCC. The method of Embodiment BBB, wherein the porous substrate has a thickness of from 10 micrometers to 100 micrometers.

DDD. The method of Embodiment CCC, wherein the porous substrate has a thickness of from 20 micrometers to 50 micrometers.

EEE. The method of Embodiment DDD, wherein the porous substrate has a thickness of from 5 micrometers to 10 micrometers.

FFF. The method of any one of Embodiments II, JJ, KK, LL, MM, NN, OO, PP, QQ, RR, SS, TT, UU, VV, WW, XX, YY, ZZ, AAA, BBB, CCC, DDD or EEE, wherein the asymmetric hollow fiber membrane is a non-homogeneous asymmetric hollow fiber membrane.

GGG. The method of any one of Embodiments II, JJ, KK, LL, MM, NN, OO, PP, QQ, RR, SS, TT, UU, VV, WW, XX, YY, ZZ, AAA, BBB, CCC, DDD, EEE or FFF, wherein the skin layer completely covers the porous substrate.

HHH. The method of any one of Embodiments II, JJ, KK, LL, MM, NN, OO, PP, QQ, RR, SS, TT, UU, VV, WW, XX, YY, ZZ, AAA, BBB, CCC, DDD, EEE, FFF or GGG, wherein the skin layer comprises an outer layer, an inner layer, or both an outer layer and an inner layer of the asymmetric hollow fiber membrane.

Various aspects and advantages of exemplary embodiments of the disclosure have been summarized. The above Summary is not intended to describe each illustrated embodiment or every exemplary embodiment of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 4a is micrograph obtained using scanning electron microscopy of the porous interior surface of an exemplary hollow fiber membrane including a nucleating agent according to certain embodiments of the present disclosure.

FIG. 4b is micrograph obtained using scanning electron microscopy of the porous interior surface of another exemplary hollow fiber membrane including a nucleating agent according to certain additional embodiments of the present disclosure.

FIG. 4c is micrograph obtained using scanning electron microscopy of the porous interior surface of an additional exemplary hollow fiber membrane including a nucleating agent according to certain further embodiments of the present disclosure.

Figure 1:
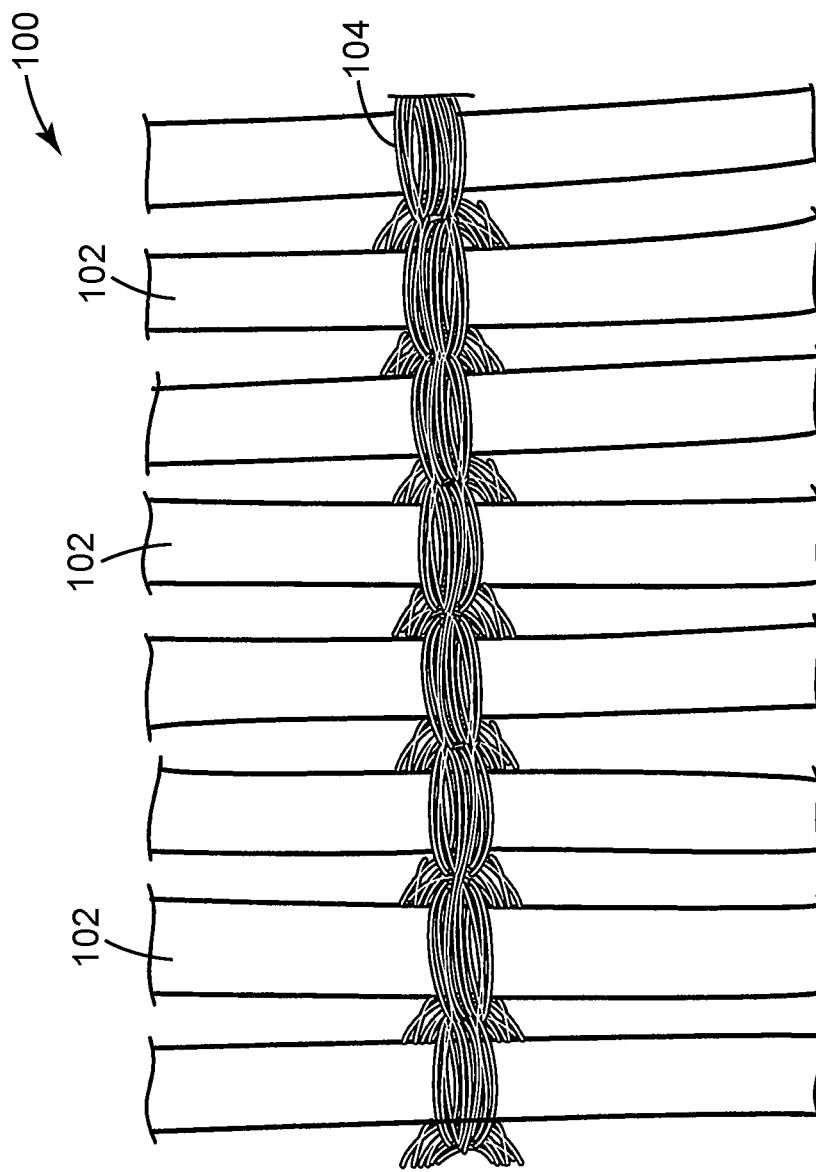
FIG. 1 is a magnified surface view of an exemplary hollow fiber membrane array useful in producing porous membrane contactors according to certain embodiments of the present disclosure.

In the drawings, like reference numerals indicate like elements. While the above-identified drawings, which may not be drawn to scale, set forth various embodiments of the present disclosure, other embodiments are also contemplated, as noted in the Detailed Description. This Detailed Description describes representative exemplary and presently-preferred embodiments. It should be understood that numerous other modifications and embodiments can be devised by those skilled in the art, which fall within the scope and spirit of this disclosure and the claims.

DETAILED DESCRIPTION

For the following Glossary of defined terms, these definitions shall be applied for the entire application, unless a different definition is provided in the claims or elsewhere in the specification.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. Thus, it should understood that:

The terms "(co)polymer" or "(co)polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

The term "hollow fiber membrane" means an artificial semi-permeable barrier in the form of an open tubular filament of indeterminant length.

The term "asymmetric" with respect to a hollow fiber membrane means that the membrane has two major surfaces, an internal lumen surface and an external sheath surface, that are compositionally and/or structurally and/or functionally different.

The term "homogeneous" means exhibiting only a single phase of matter when observed at a macroscopic scale.

The term "microporous" with respect to a hollow fiber membrane means that the membrane is formed of a solid matrix with defined, generally circular openings or holes (i.e., pores) formed therein, wherein the pores generally have a diameter of at least 10 nm, and less than 1 mm.

The term "non-porous" with respect to a hollow fiber membrane skin layer means a dense film without defined openings (i.e., pores). Permeants (e.g., gases, liquids and/or dispersed solid particulates) may nevertheless be transported through a non-porous skin layer by diffusion under the driving force of a concentration, pressure, or electrical potential gradient.

The term "nucleating agent" means a substance which promotes the crystallization of semi-crystalline polymers in melt processing.

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

By using terms of orientation such as "atop", "on", "over," "covering", "uppermost", "overlaying," "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture. By using the term "overcoated" to describe the position of a layer with respect to a substrate or other element of an article of the present disclosure, we refer to the layer as being atop the substrate or other element, but not necessarily contiguous to either the substrate or the other element.

By using the term "separated by" to describe the position of a layer with respect to other layers, we refer to the layer as being positioned between two other layers but not necessarily contiguous to or adjacent to either layer.

The terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art using the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Hollow Fiber Membranes

Figure 2:
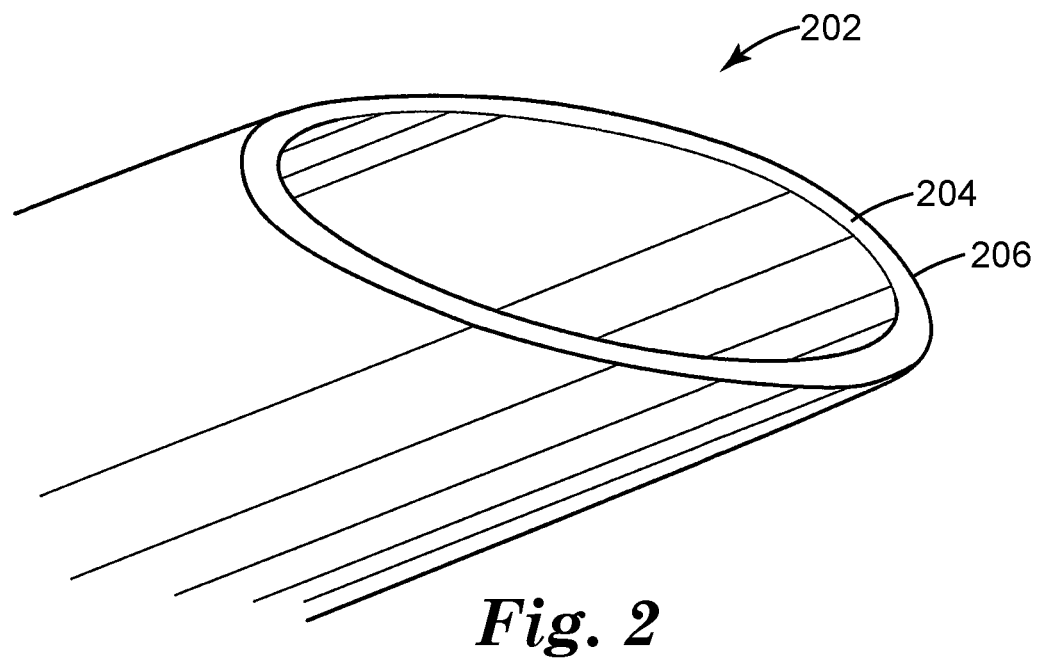
FIG. 2 is a magnified perspective view of an end of an exemplary hollow fiber membrane according to certain embodiments of the present disclosure.

Referring now to FIG. 2, in one embodiment, the present disclosure describes a hollow fiber membrane 202 including a porous substrate 204 having a plurality of pores, and a skin layer 206 overlaying the porous substrate 204. The porous substrate 204 includes a first semi-crystalline thermoplastic polyolefin (co)polymer and a nucleating agent in an amount effective to achieve nucleation. The skin layer 206 includes a second semi-crystalline thermoplastic polyolefin (co)polymer derived by polymerizing at most 98 wt. % of 4-methyl-1-pentene monomer with at least 2 wt. % of linear or branched alpha olefin monomers selected from the group consisting of ethylene, propylene, 1-butene, 1-pentene, 1-hexene, 1-heptene, isobutylene, vinylcyclohexane, 3-ethyl-1-pentene, 1,3-methyl-1-pentene, cyclobutene, cyclopentane, 2-norbornene, 3-methyl-2-norbornene, 5-methyl-2-norbornene, tetracyclododecene, methyltetracyclo-dodecene, dimethyltetracyclododecene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof. In some exemplary embodiments, the first thermoplastic polyolefin (co)polymer is compositionally different from the second thermoplastic polyolefin (co)polymer. In certain exemplary embodiments, the second semi-crystalline thermoplastic polyolefin (co)polymer is a homopolymer of the linear or branched alpha olefin monomers.

Figure 3:
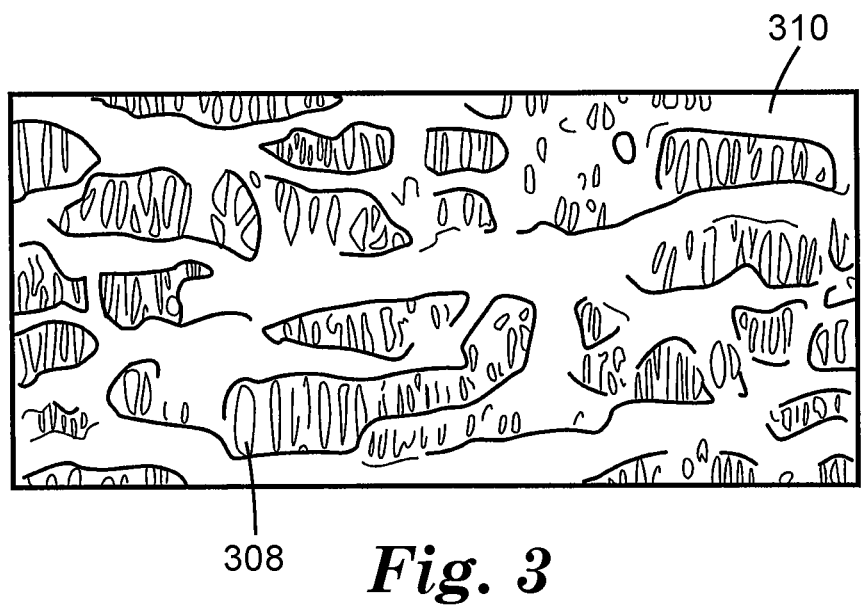
FIG. 3 is a magnified surface view of a portion of the porous substrate layer of the hollow fiber of FIG. 3 according to certain embodiments of the present disclosure.

As shown in FIG. 3, the surface 310 of the porous substrate has a plurality of pores 308. In certain presently-preferred embodiments, the plurality of pores includes micropores. In some such embodiments, the micropores have a diameter of from 0.01 micrometer to 1.0 micrometer. In other embodiments, the micropores have a diameter of from 0.02 micrometer to 0.5 micrometer. In further exemplary embodiments, the asymmetric hollow fiber membrane exhibits a porosity of from 5% to 80%. In other embodiments, the asymmetric hollow fiber membrane exhibits a porosity of from 10% to 50%.

In certain presently-preferred embodiments, the skin layer completely covers the porous substrate. In some exemplary embodiments, the skin layer is less porous than the porous substrate and comprises an outer surface of the asymmetric hollow fiber membrane. In some such embodiments, the porous substrate comprises an inner lumen surface, and the skin layer comprises an outer sheath surface of the asymmetric hollow fiber membrane. In certain presently-preferred embodiments, the skin layer is non-porous.

In some exemplary embodiments, the skin layer has a thickness of less than 20 micrometers or even less than 5 micrometers. In certain such exemplary embodiments, the porous substrate has a thickness of from 5 micrometers to 200 micrometers, from 10 micrometers to 100 micrometers, from 20 micrometers to 50 micrometers, or even from 5 micrometers to 10 micrometers.

In further exemplary embodiments, the asymmetric hollow fiber membrane is a non-homogeneous asymmetric hollow fiber membrane. In certain such embodiments, the skin layer is non-porous or exhibits small diameter pores and the porous substrate exhibits larger diameter pores. In some such embodiments, the membrane morphology is isotropic in the radial direction.

In certain exemplary embodiments, the asymmetric microporous hollow fiber membrane exhibits the following characteristics: $CO_2$ gas permeation rate of 22-36 GPU (1 GPU=$10^{-6}$ scc/cm$^2$-sec-cm Hg; $CO_2/N_2$ selectivity of between 13 and 14 (e.g., 13.85), skin layer thickness of 1.5-2.5 µm, porosity of the overall asymmetric microporous asymmetric hollow fiber of about 40%; fiber outer diameter (OD) of about 300 µm; fiber wall thickness of 20-40 µm; and total coverage (i.e., 100%) of the skin layer over the porous substrate.

Materials for Producing Hollow Fiber Membranes

We have discovered that poly(methyl) pentene (PMP)-polyolefin (co)polymer resins and polyolefin (PO) (co)polymer resins such as, for example, polyethylene (PE) and polypropylene (PP), can be co-extruded by incorporating a nucleating agent into the polyolefin resin. Among various suitable nucleating agents, melt sensitive, homogeneous alpha-polypropylene nucleating agents are particularly useful to form a porous substrate layer. The co-extruded PMP/PO hollow fiber membranes may exhibit higher gas permeability than previously disclosed co-extruded PMP/PMP hollow fiber membranes.

The asymmetric hollow fiber membranes can be constructed of a variety of materials, including but not limited to, thermoplastic (co)polymers such as polyolefins. In an example exemplary embodiment, a microporous asymmetric hollow fiber membrane includes a poly(methyl)pentene (PMP)-polyolefin (co)polymer skin layer positioned on a porous substrate comprised of a polyolefin (co)polymer, preferably a polyolefin homopolymer.

Porous Substrate Resins

The porous substrate resin includes one or more semi-crystalline thermoplastic polyolefin (co)polymers. The polyolefin (co)polymers may be selected from a poly(methyl) pentene (PMP)-polyolefin (co)polymer having a crystallinity that differs from that of the PMP-polyolefin (co)polymer skin layer (described below), polyethylene (PE), polypropylene (PP), or a combination thereof.

Suitable poly(4-methyl-1-pentene) (PMP)-polyolefin copolymer porous substrate resins are available from Mitsui Chemical under the trade designation TPX such as, for example, MX002, MX004, MX0020, DX310, DX470, DX560M, DX820, and DX845.

Suitable polypropylene homopolymer porous substrate resins are available from Total Petrochemicals (Houston, TX) under the trade designation FINA such as, for example FINA 3271, FINA 3276, FINA 3281, FINA 3371, FINA 3462, FINA 3480Z, or under other trade designations such as PPR 3260. Other suitable polypropylene homopolymers are available from Lyondel-Basell Industries (Pasadena, TX) under the trade designation PRO-FAX such as, for example, PRO-FAX 1280 PRO-FAX 814, PRO-FAX 1282, PROFAX 1283 or under other trade designation such as ADFLUEX X500F, ADSYL 3C30F, HP403G, TOPPYL SP 2103. Additional suitable polypropylene homopolymers are available from INEOS Olefins & Polymers, USA (Carson, CA), for example INEOS H01-00, INEOS H02C-00, INEOS H04G-00, and INEOS H12G-00. Further suitable polypropylene homopolymers are available from Exxon-Mobil Chemical Co. (Spring, TX), for example, PP1024E4, PP2252E3, PP4292E1, and PP4612E2.

Suitable polyethylene (PE) homopolymer porous substrate resins are available from Exxon-Mobil Chemical Co. Spring, TX), for example, HDPE 6908. Suitable polyethylene homopolymers are also available from Total Petrochemicals (Houston, TX), for example, HDPE 9458, HDPE9460, HL428, HL717, and Total 6480. Other suitable polyethylene homopolymers are available from Braskem Chemical and Plastics Company (LaPorte, TX), for example, HF0144, HF0150, HF0147, and FH35.

In further exemplary embodiments, the porous substrate may have a thickness in the range of 5-200 μm, of 10-100 μm, of 15-75 μm, of 20-50 μm, or of 25-35 μm. In some exemplary embodiments, the substrate may have an even lower thickness (for example, less than 5 μm), in various film and/or flat-sheet exemplary embodiments).

Skin Layer Resins

The skin layer includes a second semi-crystalline thermoplastic polyolefin (co)polymer derived by polymerizing at most 98 wt. % of 4-methyl-1-pentene monomer with at least 2 wt. % of linear or branched alpha olefin monomers selected from the group consisting of ethylene, propylene, 1-butene, 1-pentene, 1-hexene, 1-heptene, isobutylene, vinylcyclohexane, 3-ethyl-1-pentene, 1,3-methyl-1-pentene, cyclobutene, cyclopentane, 2-norbornene, 3-methyl-2-norbornene, 5-methyl-2-norbornene, tetracyclododecene, methyltetracyclododecene, dimethyltetracyclo-dodecene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof. In some exemplary embodiments, the first thermoplastic polyolefin (co)polymer is compositionally different from the second thermoplastic polyolefin (co)polymer. In certain exemplary embodiments, the second semi-crystalline thermoplastic polyolefin (co)polymer is a homopolymer of the linear or branched alpha olefin monomers.

Suitable poly(4-methyl-1-pentene) (PMP)-polyolefin copolymer skin layer resins are available from Mitsui Chemical under the trade designation TPX such as, for example, MX002, MX004, MX0020, DX310, DX470, DX560M, DX820, and DX845.

Based on nuclear magnetic resonance (NMR) analysis, linear or branched alpha-olefin co-monomers have been identified in commercially-available poly(methyl)pentene copolymers. We have discovered that use of a poly(methyl) pentene copolymer with an amount of linear or branched alpha-olefins as co-monomers of less than 2.3 wt. % can lead to a defective (e.g., porous) skin layer. On the other hand, poly(methyl)pentene copolymers with sufficient linear or branched alpha-olefins co-monomer (>2.3 wt. %) can form a non-porous skin layer. The highest linear or branched alpha-olefin co-monomer concentration in typical commercially available poly(methyl)pentene-polyolefin (co)polymer resins is about 6.7 wt. %.

The asymmetric hollow fiber membrane preferably is comprised of a skin layer resin that differs from the porous substrate resin according to one or more physical characteristics. For example, each of the skin layer and the porous substrate can be formed from a PMP-polyolefin (co)polymer resin, but the crystallinity of each of the skin layer resin and the porous substrate resin differs, resulting in a non-homogenous asymmetric hollow fiber.

In certain exemplary embodiments, the skin layer resin has a crystallinity of about 40% or less than 40%, whereas the porous substrate resin has a crystallinity of about 40% or more, for example, a crystallinity of about 60% or more. The crystallinity of the PMP-polyolefin (co)polymer may influence the porosity of the material, wherein a higher crystallinity may yield a more porous asymmetric hollow fiber as compared to a lower crystallinity. Correspondingly, the porosity of the material can affect the permeability of the asymmetric hollow fiber with respect to liquids, dispersed solid particulates, and the like.

In other exemplary embodiments, the physical characteristics of the skin layer and the porous substrate can differ on the basis of the composition of the polyolefin (co)polymers(s) used to form the skin layer and porous substrate. For example, the skin layer may be formed from one or more PMP-polyolefin (co)polymer(s), and the porous substrate may be formed from one or more polyolefin (co)polymers of homopolymers, for example, polyethylene (PE), polypropylene (PP), or a combination thereof.

In further exemplary embodiments, the skin layer resin exhibits a melting temperature ($T_m$) lower than a melting temperature of the porous substrate resin. In certain other exemplary embodiments, the skin layer resin exhibits a melting temperature ($T_m$) higher than a melting temperature of the porous substrate resin.

The gas permeability of a non-porous skin layer may be a benefit or advantage of the hollow fiber membranes described herein. By way of example only, in some exemplary embodiments, the skin layer may promote gas absorption and/or degassing of a liquid efficiently even though the skin layer is not permeable to liquids. Additionally, the temperature stability of the hollow fiber membranes described herein may be improved relative to other known membranes, as the high melting point of the PMP-polyolefin (co)polymer skin layer resin may add temperature stability to the asymmetric hollow fiber membrane.

Furthermore, an asymmetric hollow fiber membrane formed from a PMP-polyolefin (co)polymer skin layer resin and a PE or PP microporous porous substrate resin may provide the benefit of having higher gas permeability than other membranes because of the high porosity of the microporous substrate. In various exemplary embodiments described herein, a microporous substrate may be used that has a porosity of more than 20%, or more than 25%, or more than 35%, or more than 40%.

In various exemplary embodiments that include multi-layered microporous membranes, the skin layer may be positioned as any layer of a multi-layered asymmetric hollow fiber; for example, the skin layer may make up one or more outer and/or inner layers of a multi-layered asymmetric hollow fiber comprising multiple layers, for example, three or more layers. Additionally, for an asymmetric hollow fiber membrane, the skin layer may be positioned on the shell side or the lumen side of such an asymmetric hollow fiber membrane.

The skin layer may advantageously be non-porous, such as a solid skin without pores (or a micro-porous skin without permeability to liquids but with permeability to gases) that is positioned on a microporous substrate. While not wishing to be bound by any particular theory, we believe that no porosity is created in the skin layers described herein, because of a high alpha olefin co-monomer content of the skin layer resin.

The thickness of the skin layer and the sporous substrate can depend on the particular application in which the microporous asymmetric hollow fiber is employed. In some exemplary embodiments, the skin layer may be 20 micrometers (μm) or less in thickness, or 5 μm or less in thickness, or 3 μm or less in thickness, or approximately 2 μm thick. In various exemplary embodiments, decreasing the thickness of the skin layer results in a more efficient asymmetric microporous asymmetric hollow fiber membrane.

Nucleating Agents

The porous substrate resin advantageously further includes a nucleating agent in an amount effective to achieve nucleation. Suitable nucleating agents are known to those skilled in the art, and include alpha nucleating agents and gamma nucleating agents.

Alpha-nucleating agents can either be melting nucleating agents or insoluble nucleating agents. A melting nucleating agent is a nucleating agent that melts during the blending of the melt blend but recrystallizes before the polymer separates from the mixture and crystallizes. Exemplary melting nucleating agents include, but are not limited to, aryl alkanoic acid compounds, benzoic acid compounds, dicarboxylic acid compounds, and sorbitol acetal compounds.

Exemplary melting nucleating agents include, but are not limited to, dibenzylidine sorbitol, adipic acid, benzoic acid and sorbitol acetal compounds. Exemplary commercially-available melting nucleating agents include, but are not limited to, MILLAD® 3988 and MILLAD® NX8000 available from Milliken Chemical (Spartanburg, SC); or NA-806A available from Aniline. Chemical Corporation (Hasbrouck Heights, NJ).

An insoluble alpha nucleating agent is a nucleating agent that does not melt during the blending of the melt blend. Generally, a material can be useful as an insoluble nucleating agent if it can be uniformly dispersed in the melt blend as discrete particles capable of acting as a heterogeneous nucleation site for the polymer component.

Exemplary insoluble nucleating agents include, but are not limited to, inorganic particulate materials and pigments. Exemplary inorganic particulate materials include, but are not limited to, bicyclo[2.2.1]heptane-2,3-dicarboxylic acid, disodium salt (commercially available from Milliken & Company (Spartanburg, SC) under the trade designation HYPERFORM® HPN-20E), $TiO_2$, talc, fine metal particles or fine particles of a polymeric material such as polytetrafluoroethylene.

Exemplary pigments include, but are not limited to, copper phthaloeyanine blue or green pigment and D&C Red 6 (Disodium Salt), for example. The particular nucleating agent that is used can be selected based on one or more criterion such as the polyolefin (co)polymer used in the porous substrate, the desired pore size m the particular zone of the porous membrane, and the like.

Alpha nucleating agents aid the formation the alpha crystals (monoclinic crystal configuration) only. There are also useful gamma nucleating agents which are effective to generate gamma crystals (hexagonal unit cell crystal configuration). Exemplary gamma nucleating agents include-, but are not limited to, quinacridone dye, aluminum salt of 6-quinazirin sulfonic acid, disodium salt o-phthalic acid, isophthalic and terephthalic acids, and N,N'-dicycohexyl-2, 6-naphthalene dicarboximide compounds. Exemplary commercially-available gamma nucleating agent include, but are not limited to, MPM 2000 commercially available from Mayzo, Inc. (Suwanee, GA).

Suitable, nucleating agents for polyethylene (PE) porous substrate resins include, but are not limited to, inorganic nano-sized (i.e., having a particle dimension or diameter of less than one micrometer) fillers like calcium carbonate, titanium dioxide, barium sulfate, silicon dioxide, graphite, carbon nanotubes, Montmorillonite clay, talc, halloysite; or organic fillers like ultra-high molecular weight PE, polymer fibers, anthracene, potassium hydrogen phthalate, benzoic acid type compounds, sodium benzoate type compounds, and zinc monoglycerolate. Other suitable melting nucleating agents are listed in Polymer Engineering & Science. Vol. 5, (2016), page 541.

In some exemplary embodiments, a melting nucleating agent can be used alone. In other exemplary embodiments, an insoluble, nucleating agent can be used alone. In some particular embodiments, a melting nucleating agent can be used advantageously in combination with an insoluble nucleating agent.

The nucleating agent(s) are used in the melt blend in an amount sufficient to initiate nucleation (crystallization) of the polymer at nucleation sites during fiber limning. The amount of nucleating agent required depends, at least in part, on one or more of the particular (co)polymer used, the desired porosity and pore size, the particular nucleating agent used, and the like. In some exemplary embodiments, the melt blend can advantageously include no more than 5 wt. % of the nucleating agent based on the total weight of the melt blend. In other exemplary embodiments, the melt blend can include from about 100 parts per million (ppm) to less than 5 wt. % of the nucleating agent based on the total weight of the melt blend. In other exemplary embodiments, the melt blend can include no more than 2 wt. % of the nucleating agent based on the total weight of the melt blend. In other exemplary embodiments, the melt blend can include from about 200 ppm to less than 2 wt. % of the nucleating agent based on the total weight of the melt blend.

Methods of Making Hollow Fiber Membranes

The hollow fiber membranes described herein can be fabricated using various production methods depending on the desired asymmetric hollow fiber structure and the desired asymmetric hollow fiber composition. Microporous membranes can be fabricated according to various production techniques, such as the wet process, the dry-stretch process (also known as the CELGARD process), and the particle stretch process.

Generally, in the wet process, (also known as the phase inversion process, the extraction process, or the TIPS process), a polymeric raw material is mixed with an oil, a processing oil, a solvent, and/or another material, this mixture is extruded, and pores are then formed when such an oil, processing oil, solvent, and/or other material is removed.

These films may be stretched before or after the removal of the oil, solvent, and/or other material.

Generally, the microporous membranes are preferably formed via the CELGARD® process, also referred to as the "extrude, anneal, stretch" or "dry stretch" process, whereby a semi-crystalline polymer is extruded to provide a asymmetric hollow fiber precursor and a porosity is induced in the microporous substrate by stretching the extruded precursor.

Generally, in the particle stretch process, the polymeric raw material is mixed with particulate, this mixture is extruded, and pores are formed during stretching when the interface between the polymer and the particulate fractures due to the stretching forces. The dry process differs from the wet process and the particle stretch process by producing a porous asymmetric hollow fiber typically without addition of a processing oil, oil, solvent, plasticizer, and/or the like, or particulate material. Generally, the dry-stretch process refers to a process where pore formation results from stretching a non-porous precursor.

While membranes made by the dry-stretch process have met with excellent commercial success, there is a need to improve their physical attributes, so that they may be used in a wider spectrum of applications. Accordingly, an asymmetric hollow fiber is described that includes a poly(methyl) pentene (PMP-polyolefin (co)polymer) skin positioned on a porous substrate to provide functionality that may be suitable, for example, as battery separators (useful in consumer electronics applications and electric vehicle or hybrid electric vehicle applications), in blood oxygenation applications, blood filtering applications, various applications where a liquid needs to be degassed, as well as ink jet printing applications for de-bubbling or degassing ink, and may be well suited for use in hollow fiber asymmetric hollow fiber contactors or modules.

Dual-layer asymmetric hollow fiber membranes can be fabricated using co-extrusion and a dry-stretching process. The main challenge for making co-extruded PMP/PP hollow fiber is due to the substantially different processing temperature between PMP and PP. PMP has $T_m$ of 240° C. and PP has $T_m$ of 165° C. To co-extrude PMP and PP, the temperature needs to be at least 260° C. to ensure a smooth flow in the die.

On the other hand, the dry-stretching process described below allows for low processing temperature to form a suitable hollow fiber membrane precursor structure. The hollow fiber membrane precursor structure is converted to a microporous hollow fiber membrane with interconnected pores by stretching, which may be dry stretching or wet stretching.

For the dry-stretching process, the texture of the (co) polymer crystals may be important to generate controlled porosity. Well-aligned and uniformly distributed crystals enable uniform deformation in stretching. Traditional dry-stretching processes create the preferred crystal texture at low extrusion temperature and high extrusion pressure. Nucleating agents can also help achieve uniform crystal distribution. However, the preferred crystal texture for dry-stretching generally depends upon the crystal forms and deformation mechanism.

To overcome the challenges of the dissimilar processing temperatures of PMP and PP, nucleating agents may be introduced into the polyolefin used to form the porous substrate to increase the crystallization temperature. The effect of nucleating agent can be determined by the shift of the cold crystallization temperature ($T_c$) in the cooling curve as measured using differential scanning calorimetry (DSC).

Nucleating agents for polyolefins can be categorized by melt sensitivity, homogeneity, and crystal formation. Melt sensitivity refers to melting of nucleating agent in process. Homogeneity refers to dispersion of nucleating agent in PP. Crystal formation refers to types of PP crystals introducing by nucleating agent. The effect of nucleating agent can be determined by the shift of $T_c$ to higher temperatures in differential scanning calorimetry (DSC) cooling curves for the hollow fibers.

For PP fibers, the typical processing temperature to form suitable precursor structurer is at 230° C. When PMP and PP co-extrude at 260° C., PP fails to form the required porous hollow fiber membrane precursor structure. Virgin PP 3271 has $T_c$ of 118° C. The $T_c$ of PP with an added alpha-nucleating agent can shift upward to 133° C. A high $T_c$ will ensure faster solidification when co-extruding a polyolefin homopolymer like PP or PE with PMP.

The co-extruded hollow fiber membrane may have a non-porous (non-liquid permeable) skin layer or shell, and a porous substrate or core. The definition of porosity is in term of liquid permeability. The skin layer is non-porous to prevent liquid breach through hollow fiber regardless surface energy of applied liquids. The skin layer should also have a thickness within several micrometers to ensure effective gas permeability.

The porous substrate or core layer may be used to increase the gas flux and to provide fiber machinal strength. The gas permeability from various gas is used to determine selectivity. A non-porous (co)polymeric layer may exhibit intrinsic selectivity to different gases due to gas diffusivity (D) and solubility (S).

On the other hand, a defective skin layer does not provide gas selectivity. For example, a PMP-polyolefin (co)polymer non-porous skin layer has selectivity of $CO_2/N_2$ in the range of 8 to 12 depending on crystallinity and orientation of the PMP-polyolefin (co)polymer.

In view of the foregoing considerations, in a further embodiment, the disclosure describes a method of making an asymmetric hollow fiber membrane including providing a substrate resin and a skin layer resin, co-extruding the substrate resin and the skin layer resin to form an asymmetric hollow fiber membrane precursor, and stretching the asymmetric hollow fiber membrane precursor to form an asymmetric hollow fiber membrane having a skin layer made of the skin layer resin overlaying a porous substrate made of the substrate resin and having a multiplicity of pores.

The substrate resin includes a first semi-crystalline thermoplastic polyolefin (co)polymer and a nucleating agent in an amount effective to achieve nucleation. The skin layer includes a second semi-crystalline thermoplastic polyolefin (co)polymer derived by polymerizing at most 98 wt. % of 4-methyl-1-pentene monomer with at least 2 wt. % of linear or branched alpha olefin monomers selected from the group consisting of ethylene, propylene, 1-butene, 1-pentene, 1-hexene, 1-heptene, isobutylene, vinylcyclohexane, 3-ethyl-1-pentene, 1,3-methyl-1-pentene, cyclobutene, cyclopentane, 2-norbornene, 3-methyl-2-norbornene, 5-methyl-2-norbornene, tetracyclododecene, methyltetracyclododecene, dimethyltetracyclo-dodecene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof. In some exemplary embodiments, the first thermoplastic polyolefin (co)polymer is compositionally different from the second thermoplastic polyolefin (co)polymer.

In some exemplary embodiments, the skin layer resin is substantially free of any pore-forming material in an amount effective to cause pore formation. In some such embodiments, co-extruding the substrate resin and the skin layer resin to form an asymmetric hollow fiber membrane precursor includes co-extruding the substrate resin and the skin layer resin through an annular co-extrusion die to form the asymmetric hollow fiber precursor.

In certain exemplary embodiments, the method further includes annealing the asymmetric hollow fiber precursor. Preferably, annealing the asymmetric hollow fiber precursor includes annealing the asymmetric hollow fiber precursor prior to stretching the asymmetric hollow fiber precursor. In one exemplary embodiment, the annealing step may include heating the asymmetric hollow fiber precursor at a temperature of about 150° C. for about 10 minutes.

The step of co-extruding the PMP-polyolefin (co)polymer resin and the substrate resin to form an asymmetric hollow fiber precursor can include extruding the skin layer resin and the substrate resin through a co-extrusion die, for example an annular co-extrusion die, to form a PMP-polyolefin (co)polymer skin layer on a substrate layer. The co-extrusion die can be configured based on the desired thicknesses of the PMP-polyolefin (co)polymer skin layer and the substrate layer, where, in example exemplary embodiments, the substrate layer is thicker than the PMP-polyolefin (co)polymer skin layer.

Another exemplary method of making an asymmetric hollow fiber having a PMP-polyolefin (co)polymer skin layer and a porous substrate as described herein, can include the steps of: providing a skin layer resin and a substrate resin; co-extruding the skin layer resin and the substrate resin to form an asymmetric hollow fiber precursor; and stretching the asymmetric hollow fiber precursor to form an asymmetric microporous asymmetric hollow fiber having a skin layer on a porous substrate. The method can also include a step of annealing the asymmetric hollow fiber precursor prior to the stretching step.

An additional exemplary method of making an asymmetric hollow fiber having a PMP-polyolefin (co)polymer skin layer and a porous substrate as described above, can include the steps of: providing a poly(methyl)pentene (PMP) resin and a substrate resin; co-extruding the PMP resin and the substrate resin to form a hollow fiber asymmetric hollow fiber precursor; stretching the hollow fiber asymmetric hollow fiber precursor to form a hollow fiber asymmetric hollow fiber comprising PMP skin on a substrate. The substrate resin can include one or more of PMP having a crystallinity that differs from that of the PMP skin, polyethylene (PE), polypropylene (PP), or combinations thereof. The method can also include a step of annealing the hollow fiber asymmetric hollow fiber precursor prior to the stretching step.

Stretching can be advantageously performed using single or multi-stage cold stretching, optionally followed by single or multi-stage hot stretching. Preferably, the cold stretching temperature is selected to be between 20° C. and 90° C., more preferably between 30-70° C. Preferably, the hot stretching temperature is selected to be between 100° C. and 200° C., more preferably between 120-170° C.

The hollow fiber precursor may be advantageously stretched to form an open porous structure by uniaxial or biaxial extension of at least 5%, and up to 500%, more preferably at least 10% and up to 300%.

The hollow fiber precursors after stretching may advantageously be exposed to a step of heat-setting to reduce the stress inside the fibers. The heat-setting temperature is typically selected to be higher than the hot stretching temperature by at least 5° C., at least 10° C., or even at least 15° C. The heating setting duration is typically selected to be at least 30 seconds, at least one minute, or at least 90 second.

Alternatively, the hollow fibers after stretching may advantageously be exposed to a heat-setting or stress relaxation step by allowing fiber lengths to shrink to a certain extent, which is at least 2%, or even at least 5%. Heat-setting and stress relaxation can be used alone or combination.

Separation Articles (Hollow Fiber Membrane Contactors)

Referring once again to the drawings, FIG. 1 shows an exemplary hollow fiber membrane contactor component 100 in which a plurality of asymmetric hollow fiber membranes 102 is arranged substantially parallel in an array pattern and fastened together, in this case, by knitting or tying together the individual hollow fiber membranes 102 using string, thread, yarn, or the like 104. Thus, in further exemplary embodiments, the present disclosure describes a separation article comprising a multiplicity of the asymmetric hollow fiber membranes according to any of the foregoing embodiments.

In some exemplary embodiments, the multiplicity of asymmetric hollow fiber membranes is arranged in an array. In certain such embodiments, the array is pleated, folded, or rolled into a cylinder or a cassette.

In some exemplary embodiments, the separation article is selectively permeable to $CO_2$ over $N_2$ or $CH_4$. Preferably, the separation article exhibits a $CO_2/N_2$ selectivity of at least 8. In other exemplary embodiments, the filtration article is selectively permeable to $O_2$ over $N_2$.

A hollow fiber membrane contactor typically includes a cylindrical bundle or mat of asymmetric hollow fibers, and a rigid cylindrical shell or housing enclosing the fiber bundle. The shell may be provided with multiple ports, for example, four fluid ports: an inlet for introducing the first fluid, an outlet for discharging the first fluid, an inlet for introducing the second fluid, and an outlet for discharging the second fluid. The hollow fibers may be potted on both ends, within the housing, to form polymeric tube sheets with the fiber bores opening on each end into common first and second end cap portions of the shell.

The number of windings or layers of hollow fiber array or fabric determines the depth of the panel. The end result is a hollow fiber array with X height, Y width, and Z depth. The hollow fiber array may be potted directly into a square or rectangular frame, similar in shape to an HVAC air filter. In at least one embodiment, gas to be treated would pass through the contactor array on the shell side (outside of the hollow fibers) in a cross-flow pattern with liquid (hot, cold, humidifying, or absorbent liquid) passing through the lumen side (interior of the hollow fibers) of the contactor array.

If needed, the ends of the hollow fibers are opened and the lumen side fluid head spaces are formed or added at each end. Such a panel contactor is adapted to have air pass through the array on the shell side (outside of hollow fibers) in a cross-flow pattern with liquid (hot, cold, humidifying, and/or absorbent liquid) passing through or vacuum applied to the lumen side (interior of the hollow fibers) of the contactor array.

In at least one other embodiment, the panel contactor is produced by a method including pleating or folding (for example, z folded, accordion folded, or pleated, and then optionally wound) a hollow fiber membrane array to form a square or rectangular format fiber bundle. The number of folds or layers may determine the depth of the panel. The end result is a fiber array with X height, Y width, and Z depth. Then, the folded or pleated array is potted directly into a square or rectangular frame, similar in shape to an HVAC air filter.

Methods of Using Hollow Fiber Membrane Contactors

The present disclosure also describes methods of using any of the foregoing separation articles, in which the separation article is used to separate a gas phase from a liquid phase. Thus, in further exemplary embodiments, the disclosure is directed to methods of using the foregoing asymmetric hollow fiber membrane contactors. Such asymmetric hollow fiber membrane contactors and/or use may address one or more of the above-described needs or drawbacks of conventional hollow fiber membranes.

Asymmetric hollow fiber membrane contactors may also provide a means of accomplishing gas/gas, gas/liquid, and liquid/liquid (which can encompass liquid/dissolved solid) separations, transfers or additions. Membrane contactors typically are used to bring two immiscible fluid phases, for example, a first liquid and a second liquid, or a gas and a liquid, into contact with one another to effect separation and/or transfer of one or more components from one fluid to the other.

In certain embodiments, the gas phase includes $N_2$, $O_2$, $CO_2$, $CH_4$, or a combination thereof. In some such embodiments, the liquid phase includes liquid water. In certain presently-preferred embodiments, the liquid phase is an aqueous printing ink, or an aqueous brine (e.g., an aqueous well-injection brine used in petroleum recovery).

Asymmetric hollow fiber membranes according to the present disclosure may be used for many purposes, including but not limited to, removing entrained gases from liquids, de-gassing liquids, filtering liquids, and adding a gas to a liquid. More particularly, asymmetric hollow fiber membrane contactors may be used advantageously in removing entrained gases from inks used in printing.

Dual layer microporous hollow fiber made using the presently-disclosed co-extrusion and dry-stretch process may be used advantageously for liquid gassing and degassing applications. The dual layer hollow fiber membrane is composed of a thin non-porous skin layer and a porous substrate layer. The dual layer hollow fiber membrane can be used to treat aqueous solutions as well as organic solvents. High gas permeability is achieved by incorporating a nucleating agent in the porous substrate layer.

In gassing/degassing processes, a continuous liquid/gas interface is created on the surface of microporous fiber. In aqueous solutions, liquid does not breach the fiber due to hydrophobicity of polypropylene and small pore size (50~100 nm). Surface porosity enables fast gas transfer cross fiber surface. However, typical hollow fiber membrane contactors can only process aqueous solutions.

For organic solvents or aqueous mixtures of water in a high proportion (e.g., greater than 50 wt. %, at least 60 wt. %, 70 wt. %, 80 wt. %, or even 90 wt. %) of an organic solvent, wetting of the polyolefin pore wall is inevitable due to the low surface energies of organic solvents and polyolefins. Under such process conditions, the hollow fiber membrane contactor may fail because of liquid breaching.

One approach to degas organic solvents is the use of an asymmetric polymethyl-pentene fiber which has a unique thin non-porous skin layer with porous substrate layer. The thin non-porous skin layer prevents liquid breach through while still maintains substantial gas permeability.

In accordance with at least one embodiment, a membrane contactor system includes a source of liquid, a source of air or gas, and at least one hollow fiber membrane contactor including a plurality of asymmetric hollow fibers, preferably contained in a frame, shell, housing, vessel, or the like. The source of liquid is preferably in fluid communication with the exterior surfaces or sheaths of the hollow fibers. The air or gas preferably passes over or across the hollow fibers and passes into the interior lumens of the hollow fiber membranes and then passes out of the membrane contactor.

Thus, in at least certain embodiments, the present disclosure is directed to methods of using or uses of flat panel hollow fiber array contactors. In at least one embodiment, the panel contactor is used by a method including passing air to be treated through the contactor array on the shell side (outside of the hollow fibers) in a cross flow pattern at the same time that liquid (hot, cold, humidifying, and/or absorbent liquid) is passing through the lumen side (interior of the hollow fibers) of the contactor array. As such, the contactor is a lumen-side liquid contactor.

In at least one additional embodiment, the panel contactor is used by or in a method including passing liquid to be treated through the contactor array on the shell side (outside of the hollow fibers) in a cross-flow pattern at the same time that a second liquid or gas is passing through the lumen side (interior of the hollow fibers) of the contactor array. As such, the contactor is a shell-side liquid contactor.

Other uses of the disclosed panel contactor may include, for example: $CO_2$ scrubbing, greenhouse gas scrubbing, $SO_x$ scrubbing, $NO_x$ scrubbing, HCl scrubbing, ammonia scrubbing, gas humidification, gas dehumidification, absorption of moisture and latent heat for energy recovery in HVAC systems, air emission controls of noxious odors, such as at cattle or hog farms), and/or gas temperature control by varying the humidity level (such as in evaporative cooling or in a swamp cooler).

Thus, in accordance with at least selected embodiments of the present disclosure, the presently-disclosed hollow fiber membrane contactors address the drawbacks of prior contactors, are effective for some applications, are especially adapted for certain conditions, may have immediate customer familiarity and acceptance, do not use metal or other corrosive materials, do not use PVC, are modular, are replaceable, have standard air filter sizes, accommodate high air flow rates, have low shell-side pressure drop, allow for commercial production, and the like.

In at least one embodiment, a self-contained hollow fiber membrane contactor, filter or cartridge may include at least a first hollow fiber array including a plurality of at least first hollow fiber membranes each having a first end and a second end both being open, at least one rectangular frame, shell, casing or housing, and potting at each end. The first and second membrane ends are open, for example, to allow liquid to pass there through. It may be preferred that the hollow fibers be polyolefin, the frame be ABS, the potting be made of epoxy, and that the ends of the potting be cut off to form the open first and second hollow fiber ends following potting.

In accordance with at least selected embodiments, a combination or system of flat panel contactors includes two or more hollow fiber membrane panel contactors connected in series or in parallel. According to at least particular possibly preferred embodiments, the combination or system of flat panel contactors includes two or more hollow fiber membrane panel contactors connected in series with the frames of adjacent contactors abutting and aligned with one another (an optional gasket can be placed between abutting frames and/or between the end frames and duct work to provide an air tight seal there between).

In accordance with at least selected possibly preferred embodiments, the present panel membrane contactors (or membrane cartridges) preferably use thousands of asymmetric microporous hollow fibers knitted including into an array that is, for example, wound around a paddle or similar form, pleated, folded, and/or combinations thereof. During preferred operation, the air to be treated flows over the shell side (outside) of the hollow fibers, while the liquid desiccant flows through or in the lumen side or lumen side (inside) of the hollow fibers. Because of its hydrophobic nature, the membrane acts as an inert support to allow direct contact between a gas and liquid phase without dispersion.

In accordance with certain embodiments of the invention, there are provided a novel contactor, contactor system, method, and/or the like for treating one fluid with another fluid. The typical applications include oxygen removal from boiler water, beverage carbonation, nitrogenation, and ink degassing. The system used for gassing/degassing is also known as membrane contactor. A gas-liquid interface is formed on the surface of microporous membrane due to fiber hydrophobicity and small pore size. The efficiency of a hollow fiber membrane contactor is largely determined by the membrane gas transfer rate, which depends on fiber permeability and available fiber surface area in the module.

A typical hollow fiber membrane contactor consists of hundreds to thousands of asymmetric hollow fibers with at least 40% porosity. Smaller fiber diameters can allow a higher fiber packing density and provide higher total membrane surface area compared to a flat sheet membrane.

The operation of certain exemplary embodiments of the present disclosure will be further described with regard to the following detailed Examples. These Examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Test Methods

The following test methods have been used in evaluating some of the Examples of the present disclosure.

Gas Permeability Test:

The Gas Permeability Test is used as an integrity test for the non-porous skin layer as well as a performance test for the hollow fiber membranes.

Loop modules were prepared by sealing hollow fibers together in a ¼" OD nylon tube with Loctite® EA608 epoxy adhesive. Fiber lumen were exposed by cutting the sealing tube with a razor blade after at least partially curing. Each loop module contained 10 fibers with 4" (about 10.2 cm) effective length.

The Gas Permeability Test was conducted using a custom designed test stand. The stand was equipped with cylinders of pure gases ($CO_2$ and $N_2$), pressure gauges, and in-line gas flow meters. The principle of this testing is to supply a pure gas into fiber lumen and to measure the rate of the gas leaking through fiber walls into ambient environment. Both gas pressure and gas flow rate were monitored by a data acquisition software, and data are acquired when both pressure and gas flow are stabilized. Gas pressure in the fiber lumen was typically set at about 30 psi. Each fiber loop module was tested with $CO_2$ and $N_2$, respectively.

The gas permeation rate (GPU) of each fiber membrane was calculated as follows $$\text{Gas permeation }(GPU) = \frac{Q}{\Delta P * A} * 10^6$$

wherein:
Q is the gas flow rate (scc/sec)
ΔP is the gas pressure differential reading (cm Hg)
A is the fiber outer surface area ($cm^2$)
The $CO_2/N_2$ selectivity of fibers was calculated from gas permeation rates of each gas as shown below.

$$\text{Selectivity} = \frac{CO_2(GPU)}{N_2(GPU)}$$

The fiber gas selectivity has been used as an indicator of skin integrity. The selectivity of PMP is typically in the range 11-13 according to a literature report (Polymer, 1989, 30, P1357). Any fiber with gas Selectivity below 8 was considered to have a defective skin.

Differential Scanning Calorimetry (DSC) Test

Differential scanning calorimetry measurements were carried out on PMP resin samples to determine melting temperature, crystallinity and heat of fusion. DSC tests were carried out using a TA Instruments (New Castle, DE) Model Q2000 differential scanning calorimeter with sample weight of about 5 mg. For melting temperature measurements, the heating rate was 10° C./min and the scan range was from −50° C. to 280° C. For crystallization temperature measurements, the samples were first maintained isothermally at 280° C. for 10 minutes to erase their thermal history, and then cooled down to 25° C. at 10° C./min.

Nuclear Magnetic Resonance (NMR) Test:

Nuclear magnetic resonance measurements were carried out on PMP resin samples to determine chemical composition. The PMP resin was dissolved in deuterated orthodichlorobenzene (ODCB, Sigma-Aldrich, St. Louis, MO) with Chromium (III) acetylacetonate ($Cr(acac)_4$, Sigma-Aldrich, St. Louis, MO). One dimensional (1D) $^{13}C$ NMR data for each resin was collected using a Bruker Avance (Billerica, MA) 500 MHz NMR spectrometer equipped with a cryogenically cooled probe head. All data were acquired under the samples held at 127° C. Molar or mass percentage of 4-methyl-1 pentene and co-monomer was calculated by signals.

Scanning Electronic Microscopy (SEM) Test

Scanning electron microscopy was used to determine the diameter of hollow fiber membranes.

Summary of Materials

Unless otherwise noted, all parts, percentages, ratios, etc. in the Examples and the rest of the specification are by weight. Solvents and other reagents used may be obtained from Sigma-Aldrich Chemical Company (Milwaukee, WI) unless otherwise noted. The following materials are used in the following Examples:

Polypropylene PPH3271, Total Petrochemicals USA, Inc. (Houston, Texas);
PMP-Polyolefin Copolymer Resin DX470, Mitsui Chemical (Minato-Ku, Tokyo, Japan);
Nucleating Agent HPN-20E, Milliken & Company (Spartanburg, SC);
Nucleating Agent NX8000, Milliken & Company (Spartanburg, SC);
Nucleating Agent MPM 2000, Mayzo, Inc. (Suwanee, GA);
$N_2$, Industrial Grade Nitrogen NI300, Airgas, Inc. (Radnor, PA);
$CO_2$, Instrument 4.0 Grade Carbon Dioxide CDI200, Airgas (Radnor, PA);
¼" Nylon tube, NewAge Industries Company (Southampton, PA);
LOCTITE EA 608 Hysol, Henkel Corporation (Rocky Hill, CT);
Deuterated orthodichlorobenzene (ODCB), Sigma-Aldrich (St. Louis, MO);
Chromium (III) acetylacetonate, $(Cr(acac)_4)$ Sigma-Aldrich (St. Louis, MO);
Other suitable PMP-polyolefin (co)polymer resins include, for example:
PMP-Polyolefin Copolymer Resin DX310, Mitsui Chemical (Minato-Ku, Tokyo, Japan);
PMP-Polyolefin Copolymer Resin DX820, Mitsui Chemical (Minato-Ku, Tokyo, Japan);
PMP-Polyolefin Copolymer Resin DX845, Mitsui Chemical (Minato-Ku, Tokyo, Japan);
PMP-Polyolefin Copolymer Resin MX002, Mitsui Chemical (Minato-Ku, Tokyo, Japan);
PMP-Polyolefin Copolymer Resin MX004, Mitsui Chemical (Minato-Ku, Tokyo, Japan);

In addition, Table 1 provides abbreviations, properties, and composition of suitable PMP-polyolefin copolymer resins useful in forming skin layers according to various embodiments, in which "PMP" refers to polyolefin copolymer segments derived from 4-methyl-1-pentene monomer; $T_m$ refers to the melting temperature obtained using differential scanning calorimetry (DSC); and $\Delta H_m$ is the heat of fusion (melting) obtained using the Differential Scanning calorimetry (DSC) Test and the Nuclear Magnetic Resonance (NMR) Test as described further above.

TABLE 1

Material Property of PMP-Polyolefin Copolymer Resins

| Poly(methyl) pentene-Polyolefin Copolymer: | | | | | | |
|---|---|---|---|---|---|---|
| | DX845 | DX470 | DX820 | MX002 | DX310 | MX004 |
| Modulus (MPa) | 1900 | 1900 | 1900 | 900 | 900 | 1300 |
| $T_m$ (° C.) | 232 | 236 | 234 | 224 | 227 | 228 |
| $\Delta H_m$ (J/g)* | 32.3 | 42.3 | 40.1 | 21.6 | 13.3 | 19.5 |
| $T_c$ (° C.) | 213 | 217 | 214 | 207 | 206 | 211 |
| Melt Flow Rate** (g/10 min) | 9 | 30 | 180 | 21 | 100 | 25 |
| Percent PMP (wt. %) | 97.7 | 98.6 | 98.7 | 93.3 | 93.9 | 96.1 |
| Percent Alpha-Olefin Comonomer (wt. %)*** | 2.3 | 1.4 | 1.3 | 6.7 | 6.1 | 3.9 |

*Heat of fusion measured at a temperature ramp at 10° C./min using the Differential Scanning Calorimetry (DSC) Test.
**Data from Mitsui Chemical literature, measured at 260° C. under 5 $kg_f$ load.
***Non-PMP alpha-olefin co-monomer content in polyolefin copolymer, measured using the Nuclear Magnetic Resonance (NMR) Test Apparatus and Methods Apparatus for Making Co-extruded Hollow Fiber Membranes Dual-layer hollow fiber precursors were co-extruded through a two-orifice annular ring die with a center air hole (available from Guill Tools, West Warwick, RI) using two Haake Single Screw Extruder, available from ThermoFisher Scientific (Grand Island, NY). The substrate resin was extruded through a central core of the die, and the skin layer resin was extruded through the annular ring of the die.

After exiting the die, the molten hollow fiber was solidified through a quench ring and collected by passing the hollow fiber precursor through motor driven Godet rollers and winding on a tension-controlled spooler.

Process for Making Co-extruded Hollow Fiber Membranes

1. Hollow Fiber Membrane Precursor Extrusion

Skin layer PMP-polyolefin (co)polymer resin and porous substrate PP or PMP resins were fed into two single screw extruders. The porous substrate resin was extruded using a ¾" (1.91 cm) extruder with 24 L/D, and the skin layer resin was extruded using a ½" (1.27 cm) extruder with a smaller output. A 3-zone porous substrate resin extruder was controlled at temperatures ranging from 190° C. to 210° C. from zone 1 to zone 3, while the 3-zone skin layer extruder was controlled at temperatures ranging from 240° C. to 250° C. for zones 1 to 3. The extrusion die temperature was set at 250° C.

The two molten resin streams were metered through by pumps into a two-orifice die (custom designed co-extruded die) with a center air hole. The two molten streams converged inside the die at the location <5 mm away from the die face. The orifices in the die were fine-tuned to maintain good concentricity to ensure the wall and layer uniformity of two-layer hollow fiber membranes. The extrusion rate of the skin layer resin was maintained significantly lower than the extrusion rate of the substrate resin in order to reduce the thickness of the skin layer.

A low volume air flow was supplied in the center hole to prevent fibers from either collapsing or over blowing. The molten fibers were solidified by passing through an air quench ring. The hollow fiber precursor diameter was controlled by drawing down with motor-driven Godet rolls. The drawing speed was set at 100 meters per minute. The resultant hollow fiber membrane precursors were collected using a low-tension spooler 2. Hollow Fiber Membrane Annealing A 10" (25.4 cm) hollow fiber precursor bundle was made with each end taped together using a high temperature tape. The bundle was annealed in a convection oven set at a temperature of 140° C. The annealing time for each fiber precursor bundle was 10 min.

3. Hollow Fiber Membrane Stretching (Cold/Hot) and Heat Setting

A bundle of 40-45 annealed fibers was clamped in a temperature-controlled environmental chamber of an Instron Mechanical Tester (Model #5567, Morwood, MA).

The fibers were cold-stretched at 23° C. using a stretching rate of 10 inches/min. (25.4 cm/min.) to a 20% extension (stretch) ratio, and subsequently hot-stretched at 138° C. using a stretching rate of 1 inch/min. (2.54 cm/min.) to a 25% extension (stretch) ratio.

During the temperature ramp from 23° C. to 150° C., the fibers were held under tension. No fiber relaxation was permitted after hot stretching. The fibers were released from the Instron Mechanical Tester after the chamber temperature was cooled to 40° C. or below.

The specific process conditions used in the Examples and Comparative Examples are provided in Tables 2 and 3.

TABLE 2

Process Conditions for Hollow Fiber Membrane Precursors

| Example | Substrate Extruder | | | Skin Layer Extruder | | | Winding | |
|---|---|---|---|---|---|---|---|---|
| | Temperature (° C.) | Pressure (kPa) | Melt Pump Flowrate (cc/min) | Temperature (° C.) | Pressure (kPa) | Melt Pump Flowrate (cc/min) | Die Temperature (° C.) | Fiber Winding Speed (m/min) |
| Comparative A | 215-260 | 2056 | 3.6 | 235-240 | 2758 | 0.32 | 260 | 110 |
| Example 1 | 190-210 | 3447 | 3.0 | 240-250 | 2758 | 0.32 | 250 | 100 |
| Example 2 | 190-210 | 3447 | 3.0 | 240-250 | 2758 | 0.32 | 250 | 100 |
| Example 3 | 190-210 | 4620 | 3.0 | 240-250 | 2758 | 0.32 | 250 | 100 |
| Example 4 | 190-210 | 3275 | 3.0 | 240-250 | 2758 | 0.32 | 250 | 100 |

TABLE 3

Process Conditions for Hollow Fiber Membrane Annealing and Stretching

| Example | Annealing | | Stretching | | | | | |
|---|---|---|---|---|---|---|---|---|
| | Temperature (° C.) | Time (min) | Cold Stretching Temperature (° C.) | % Cold Stretch | Cold Stretching Rate (cm/min) | Hot Stretching Temperature (° C.) | % Hot Stretch | Hot Stretching Rate (cm/min) |
| Comparative A | 145 | 10 | 40 | 18 | 25.4 | 150 | 25 | 2.54 |
| Comparative B | 145 | 10 | 40 | 18 | 25.4 | 150 | 25 | 2.54 |
| Example 1 | 140 | 10 | 24 | 20 | 25.4 | 138 | 50 | 2.54 |
| Example 2 | 140 | 10 | 24 | 20 | 25.4 | 138 | 25 | 2.54 |
| Example 3 | 140 | 10 | 24 | 20 | 25.4 | 138 | 25 | 2.54 |
| Example 4 | 140 | 10 | 24 | 20 | 25.4 | 138 | 25 | 2.54 |

Comparative Example A

PMP-PO (Co)polymer/PMP-PO (Co)polymer Co-extruded Hollow Fiber Membrane

In Comparative Example A, DX470 grade resin was used in the porous substrate, and MX002 grade resin was used in the skin layer to produce a co-extruded hollow fiber membrane precursor without an added nucleating agent. Process conditions are provided in Tables 2 and 3.

After annealing and stretching, the micro-porous hollow fiber membrane gave both good $CO_2/N_2$ selectivity and good $CO_2$ gas flux, as shown in Table 4.

Comparative Example B

In Comparative Example B, DX470 grade resin was used with HPN-20E nucleating agent in the porous substrate, and MX002 grade resin was used in the skin layer to produce a co-extruded hollow fiber membrane precursor without an added nucleating agent. Process conditions are provided in Tables 2 and 3.

Surprisingly, hollow fiber membranes prepared using a PP porous substrate with HPN-20E nucleating agent showed extremely low permeability (near 0 GPU $CO_2$ Gas Flux) compared to other nucleating agents. HPN-20E is not a melt sensitive nucleating agent, and it exists as dispersed inorganic particulates in the molten polymer. It is likely that the presence of HPN-20E particulates interferes with crystal deformation during stretching. The interior (lumen) surface of a representative hollow fiber after annealing and stretching was observed to have no evidence of through-pores when observed using scanning electron microscopy, as shown in FIG. 4A.

TABLE 4

Hollow Fiber Membrane Compositions, Gas Fluxes and $CO_2/N_2$ Selectivity

| Example | Skin Layer Resin | Porous Substrate Resin | Fiber Outer Diameter D (μm) | $CO_2$ Gas Flux (GPU) | $CO_2/N_2$ Selectivity |
|---|---|---|---|---|---|
| Comparative A | MX002 | DX470 | — | 23.7 | 13.1 |
| Comparative B | MX002 | PPH3271 with 2 wt. % HPN-20E | — | ~0 | ~0 |
| Example 1 | MX002 | PPH3271 with 2 wt. % NX8000 | 297 | 27.9 +/− 1.1 | 9.4 +/− 2.2 |
| Example 2 | MX002 | PPH3271 with 2 wt. % NX8000 | 297 | 39.3 +/− 1.4 | 6.4 +/− 1.7 |
| Example 3 | MX002 | PPH3271 with 1 wt. % NX8000 | 285 | 23.8 +/− 0.7 | 15.2 +/− 1.0 |

TABLE 4-continued

Hollow Fiber Membrane Compositions, Gas Fluxes and $CO_2/N_2$ Selectivity

| Example | Skin Layer Resin | Porous Substrate Resin | Fiber Outer Diameter D (μm) | $CO_2$ Gas Flux (GPU) | $CO_2/N_2$ Selectivity |
|---|---|---|---|---|---|
| Example 4 | MX002 | PPH3271 with 2 wt. % MPM-2000 | 289 | 6.7 +/− 1.2 | 12.8 +/− 1.8 |

Examples 1-4

Co-extruded hollow fiber membranes were also made with various nucleating agents added to the PPH3271 porous substrate resin (Example 1-4). In Examples 1-3, an alpha nucleating agent (NX8000) was used; in Example 4, a gamma nucleating agent (MPM 2000) was used. The PMP/PP co-extruded hollow fiber membranes were processed in the same way as the PMP/PMP co-extruded hollow fiber membrane of Comparative Example A, except that the porous substrate resin was comprised of polypropylene PPH3271 with an added nucleating agent. Process conditions for those membranes are provided in Tables 2 and 3. After annealing and stretching, the micro-porous hollow fiber membrane gave both good $CO_2/N_2$ selectivity and good $CO_2$ gas flux, as shown in Table 4.

In Examples 1-3, PP with NX8000 gives a fiber with $CO_2$ gas flux exceeding that of the PMP/PMP co-extruded hollow fiber in Comparative Example A, while the $CO_2/N_2$ selectivity is generally greater than 8 (Example 2 exhibits $CO_2/N_2$ selectivity of 6.4), which implies a good skin integrity. NX8000 is a melt sensitive nucleating agent, and it dissolves into the PP melt during processing.

In Example 2, a highly interconnected porous surface is shown when observed using scanning electron microscopy, as shown in FIG. 4B. With a lower NX8000 content (Example 3), the PMP/PP co-extruded hollow fiber could achieve excellent $CO_2/N_2$ selectivity, which is up to 15.2.

In Example 4, PP with MPM-2000 nucleating agent in the porous substrate resin yields a hollow fiber membrane with a $CO_2$ gas flux lower than that obtained for the PMP/PMP co-extruded hollow fiber in Comparative Example A, but the $CO_2/N_2$ selectivity is greater than 8. MPM-2000 is also a melt sensitive nucleating agent, and it also introduces gamma-crystal formation in polypropylene. In Example 4, a highly interconnected porous surface with some macro-scale cracks is shown when observed using scanning electron microscopy, as shown in FIG. 4C.

The deformation of gamma-crystals is more complicated than for alpha-crystals. Beta-crystals break easily and transform to alpha-crystals during stretching. Instead of making interconnected pores, the broken/transformed gamma-crystals may turn into a flake-like structure with voids forming in between the flakes. Therefore, it is less preferable for producing highly gas permeable co-extruded hollow fiber membranes.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. An asymmetric hollow fiber membrane comprising:
a porous substrate having a plurality of pores, wherein the porous substrate includes
a first semi-crystalline thermoplastic polyolefin (co)polymer comprising polypropylene, polyethylene or a combination thereof and
a melting alpha nucleating agent or a gamma nucleating agent in an amount effective to achieve nucleation; and
a skin layer overlaying the porous substrate, wherein the skin layer includes a second semi-crystalline thermoplastic polyolefin (co)polymer derived by polymerizing at most 98 wt. % of 4-methyl-1-pentene monomer with at least 2 wt. % of linear or branched alpha olefin monomers selected from the group consisting of ethylene, propylene, 1-butene, 1-pentene, 1-hexene, 1-heptene, isobutylene, vinylcyclohexane, 3-ethyl-1-pentene, 1,3-methyl-1-pentene, cyclobutene, cyclopentane, 2-norbornene, 3-methyl-2-norbornene, 5-methyl-2-norbornene, tetracyclododecene, methyltetracyclododecene, dimethyltetracyclo-dodecene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof,
optionally wherein the first thermoplastic polyolefin (co)polymer is compositionally different from the second thermoplastic polyolefin (co)polymer.

2. The asymmetric hollow fiber membrane of claim 1, wherein the first semi-crystalline thermoplastic polyolefin (co)polymer comprises polypropylene.

3. The asymmetric hollow fiber membrane of claim 1, wherein the nucleating agent comprises melting alpha nucleating agent.

4. The asymmetric hollow fiber membrane of claim 1, wherein the porous substrate is comprised of no more than 5 wt. % of the nucleating agent.

5. The asymmetric hollow fiber membrane of claim 1, wherein the plurality of pores comprises micropores, optionally wherein the plurality of micropores has a diameter of from 0.01 micrometer to 1.0 micrometer.

6. The asymmetric hollow fiber membrane of claim 1, wherein the asymmetric hollow fiber membrane exhibits a porosity of from 5% to 80%.

7. The asymmetric hollow fiber membrane of claim 1, wherein the skin layer is less porous than the porous substrate and comprises an outer surface of the asymmetric hollow fiber membrane, optionally wherein the porous substrate comprises an inner surface of the asymmetric hollow fiber membrane.

8. The asymmetric hollow fiber membrane of claim 1, wherein the skin layer has a thickness of less than 20 micrometers.

9. The asymmetric hollow fiber membrane of claim 1, wherein the porous substrate has a thickness of from 10 micrometers to 200 micrometers.

10. The asymmetric hollow fiber membrane of claim 1, wherein the asymmetric hollow fiber membrane is a non-homogeneous asymmetric hollow fiber membrane.

11. The asymmetric hollow fiber membrane of claim 1, wherein the skin layer completely covers the porous substrate.

12. A separation article comprising a plurality of the asymmetric hollow fiber membranes according to claim 1.

13. The separation article of claim 12, wherein the plurality of the asymmetric hollow fiber membranes is arranged in an array, optionally wherein the array is pleated, folded, or rolled into a cylinder or cassette.

14. The separation article of claim 12, wherein the separation article is selectively permeable to $CO_2$ over $N_2$ or $CH_4$.

15. The separation article of claim 14, wherein the $CO_2/N_2$ or $CO_2/CH_4$ selectivity of the separation article is at least 8.

16. The separation article of claim 12, wherein the filtration article is selectively permeable to $O_2$ over $N_2$.

17. A method of making an asymmetric hollow fiber membrane comprising:
providing a substrate resin and a skin layer resin,
the substrate resin including a first semi-crystalline thermoplastic polyolefin
(co)polymer comprising polypropylene, polyethylene or a combination thereof and a melting alpha nucleating agent or a gamma nucleating agent in an amount effective to achieve nucleation,
the skin layer resin including a second semi-crystalline thermoplastic polyolefin
(co)polymer derived by polymerizing at most 98 wt. % of 4-methyl-1-pentene monomer with at least 2 wt. % of linear or branched alpha olefin monomers selected from the group consisting of ethylene, propylene, 1-butene, 1-pentene, 1-hexene, 1-heptene, isobutylene, vinylcyclohexane, 3-ethyl-1-pentene, 1,3-methyl-1-pentene, cyclobutene, cyclopentane, 2-norbornene, 3-methyl-2-norbornene, 5-methyl-2-norbornene, tetracyclododecene, methyltetracyclododecene, dimethyltetracyclododecene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof,
optionally wherein the first thermoplastic polyolefin (co)polymer is compositionally different from the second thermoplastic polyolefin (co)polymer;
co-extruding the substrate resin and the skin layer resin to form an asymmetric hollow fiber membrane precursor; and
stretching the asymmetric hollow fiber membrane precursor to form an asymmetric
hollow fiber membrane having a porous substrate comprised of the substrate resin and comprising a plurality of pores, and a skin layer comprised of the skin layer resin overlaying the porous substrate.

18. The method of claim 17, wherein co-extruding the substrate resin and the skin layer resin to form an asymmetric hollow fiber membrane precursor includes co-extruding the substrate resin and the skin layer resin through an annular co-extrusion die to form the asymmetric hollow fiber precursor.

19. The method of claim 17, further including annealing the asymmetric hollow fiber precursor, optionally wherein annealing the asymmetric hollow fiber precursor includes annealing the asymmetric hollow fiber precursor prior to stretching the asymmetric hollow fiber precursor.

* * * * *